United States Patent
Yang et al.

(10) Patent No.: US 10,856,269 B2
(45) Date of Patent: Dec. 1, 2020

(54) METHOD AND APPARATUS FOR TRANSMITTING/RECEIVING WIRELESS SIGNAL IN WIRELESS COMMUNICATION SYSTEM

(71) Applicant: LG Electronics Inc., Seoul (KR)

(72) Inventors: Suckchel Yang, Seoul (KR); Hanjun Park, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/727,375

(22) Filed: Dec. 26, 2019

(65) Prior Publication Data
US 2020/0137742 A1  Apr. 30, 2020

Related U.S. Application Data

(63) Continuation of application No. 16/440,449, filed on Jun. 13, 2019, now Pat. No. 10,588,113, which is a (Continued)

(51) Int. Cl.
*H04W 72/04* (2009.01)
*H04B 1/713* (2011.01)
(Continued)

(52) U.S. Cl.
CPC ........ *H04W 72/0406* (2013.01); *H04B 1/713* (2013.01); *H04L 1/1819* (2013.01);
(Continued)

(58) Field of Classification Search
CPC .. H04W 72/0406; H04B 1/713; H04L 1/1819; H04L 5/0055
See application file for complete search history.

(56) References Cited

U.S. PATENT DOCUMENTS

2011/0243087 A1* 10/2011 Ahn .................... H04W 52/146
                                                      370/329
2014/0056278 A1   2/2014 Marinier et al.
(Continued)

FOREIGN PATENT DOCUMENTS

KR    1020110068839    6/2011
KR    1020140126298    10/2014
(Continued)

OTHER PUBLICATIONS

3rd Generation Partnership Project; Technical Specification Group Radio Access Network; NR; "Physical layer procedures for control (Release 15)," 3GPP TS 38.213 V15.0.0, dated Dec. 2017, 56 pages.
(Continued)

*Primary Examiner* — Siming Liu
(74) *Attorney, Agent, or Firm* — Fish & Richardson P.C.

(57) ABSTRACT

The present invention relates to a wireless communication system, and more particularly, to a method including receiving indication information related to a PUCCH resource set of a specific PUCCH format through system information, the PUCCH resource set comprising a first RB offset, receiving a PDCCH including a resource indicator RI through CCE, and transmitting the control information on the PUCCH, wherein an RB index of the PUCCH is determined based on the first RB offset and a second RB offset related to a first bit value of the RI, and wherein a CS index of the PUCCH is determined based on a combination of [a second bit value of the RI, a 1-bit value based on a starting CCE index of the PDCCH (hereinafter, a CCE-based 1-bit value)] in a CS index set, and an apparatus therefor.

16 Claims, 12 Drawing Sheets

Related U.S. Application Data continuation of application No. PCT/KR2019/001839, filed on Feb. 14, 2019.

(60) Provisional application No. 62/669,952, filed on May 10, 2018, provisional application No. 62/653,466, filed on Apr. 5, 2018, provisional application No. 62/635,468, filed on Feb. 26, 2018, provisional application No. 62/630,315, filed on Feb. 14, 2018.

(51) Int. Cl.
*H04L 1/18* (2006.01)
*H04L 5/00* (2006.01)

(52) U.S. Cl.
CPC ....... *H04L 5/0055* (2013.01); *H04W 72/0446* (2013.01); *H04W 72/0453* (2013.01)

(56) References Cited

U.S. PATENT DOCUMENTS

| | | | |
|---|---|---|---|
| 2014/0126525 A1 | 5/2014 | Shen et al. | |
| 2016/0226645 A1 | 8/2016 | Kim et al. | |
| 2017/0105200 A1 | 4/2017 | Larsson et al. | |
| 2019/0223085 A1* | 7/2019 | Wang | H04W 72/1273 |
| 2019/0261356 A1 | 8/2019 | Myung et al. | |

FOREIGN PATENT DOCUMENTS

| | | |
|---|---|---|
| KR | 101580122 | 12/2015 |
| KR | 1020160030623 | 3/2016 |
| KR | 1020160048341 | 5/2016 |

OTHER PUBLICATIONS

Huawei, HiSilicon, "sPUCCH design," R1-1712078, 3GPP TSG RAN WG1 Meeting #90, Prague, Czech Republic, Aug. 21-25, 2017, 8 pages.
Korean Notice of Allowance in Korean Application No. 10-2019-7005770, dated Oct. 18, 2019, 3 pages (with English translation}.
InterDigital Communications, LLC, "Resource Indexing and RB Allocation for PUCCH Format 3," R1-105947, 3GPP TSG RAN WG1 Meeting #63, Jacksonville, FL, USA, Nov. 15-19, 2010, 5 pages.
Nokia, Nokia Shanghai Bell, "Remaining details on NR-PBCH," R1-1716524, 3GPP TSG-RAN WG1 NR AH#3, Nagoya, Japan, Sep. 18-21, 2017, 12 pages.
OPPO, "Summary of offline discussions on PUCCH resource allocation," R1-1801087, 3GPP TSG RAN WG1 Meeting AH 1801, Vancouver, Canada, Jan. 22-26, 2016, 9 pages.
Qualcomm Incorporated, "Remaining issues for resource allocation for PUCCH," R1-1800874, 3GPP TSG RAN WG1 Meeting AH 1801, Vancouver, Canada, Jan. 22-26, 2018, 9 pages.

* cited by examiner

METHOD AND APPARATUS FOR TRANSMITTING/RECEIVING WIRELESS SIGNAL IN WIRELESS COMMUNICATION SYSTEM

CROSS-REFERENCE TO RELATED APPLICATIONS

This application is a continuation of U.S. application Ser. No. 16/440,449, filed Jun. 13, 2019, which is a continuation of International Application No. PCT/KR2019/001839, filed on Feb. 14, 2019, which claims the benefit of U.S. Provisional Application No. 62/669,952, filed on May 10, 2018, U.S. Provisional Application No. 62/653,466, filed on Apr. 5, 2018, U.S. Provisional Application No. 62/635,468, filed on Feb. 26, 2018, and U.S. Provisional Application No. 62/630,315, filed on Feb. 14, 2018. The disclosures of the prior applications are incorporated by reference in their entirety.

TECHNICAL FIELD

The present invention relates to a wireless communication system, and more particularly, to a method and apparatus for transmitting/receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An object of the present invention is to provide a method of efficiently transmitting/receiving control information in a wireless communication and an apparatus therefor.

The technical objects that can be achieved through the present invention are not limited to what has been particularly described hereinabove and other technical objects not described herein will be more clearly understood by persons skilled in the art from the following detailed description.

Technical Solution

In one aspect of the present invention, provided herein is a method for transmitting control information by a communication device in a wireless communication system, the method including receiving indication information related to a physical uplink control channel (PUCCH) resource set of a specific PUCCH format through system information, the PUCCH resource set including a first resource block (RB) offset, receiving a physical downlink control channel (PDCCH) including a resource indicator (RI) through one or more control channel elements (CCEs), and transmitting the control information on the PUCCH, wherein an RB index of the PUCCH is determined based on the first RB offset and a second RB offset related to a first bit value of the RI, and wherein a CS index of the PUCCH is determined based on a combination of [a second bit value of the RI, a 1-bit value based on a starting CCE index of the PDCCH (hereinafter, a CCE-based 1-bit value)] in a CS index set.

In another aspect of the present invention, provided herein is a communication device used in a wireless communication system, including a memory and a processor, wherein the processor is configured to receive indication information related to a physical uplink control channel (PUCCH) resource set of a specific PUCCH format through system information, the PUCCH resource set including a first resource block (RB) offset, receive a physical downlink control channel (PDCCH) including a resource indicator (RI) through one or more control channel elements (CCEs), and transmit the control information on the PUCCH, wherein an RB index of the PUCCH is determined based on the first RB offset and a second RB offset related to a first bit value of the RI, wherein a CS index of the PUCCH is determined based on a combination of [a second bit value of the RI, a 1-bit value based on a starting CCE index of the PDCCH (hereinafter, a CCE-based 1-bit value)] in a CS index set.

In another aspect of the present invention, provided herein is a method for receiving control information by a communication device in a wireless communication system, the method including transmitting indication information related to a physical uplink control channel (PUCCH) resource set of a specific PUCCH format through system information, the PUCCH resource set including a first resource block (RB) offset, transmitting a physical downlink control channel (PDCCH) including a resource indicator (RI) through one or more control channel elements (CCEs), and receiving the control information on the PUCCH, wherein an RB index of the PUCCH is determined based on the first RB offset and a second RB offset related to a first bit value of the RI, and wherein a CS index of the PUCCH is determined based on a combination of [a second bit value of the RI, a 1-bit value based on a starting CCE index of the PDCCH (hereinafter, a CCE-based 1-bit value)] in a CS index set.

In another aspect of the present invention, provided herein is a communication device used in a wireless communication system, including a memory and a processor, wherein the processor is configured to transmit indication information related to a physical uplink control channel (PUCCH) resource set of a specific PUCCH format through system information, the PUCCH resource set including a first resource block (RB) offset, transmit a physical downlink control channel (PDCCH) including a resource indicator (RI) through one or more control channel elements (CCEs), and receive the control information on the PUCCH, wherein an RB index of the PUCCH is determined based on the first RB offset and a second RB offset related to a first bit value of the RI, wherein a CS index of the PUCCH is determined based on a combination of [a second bit value of the RI, a 1-bit value based on a starting CCE index of the PDCCH (hereinafter, a CCE-based 1-bit value)] in a CS index set.

Preferably, the second bit value of the RI may be used to indicate one of two CS index groups, and the CCE-based 1-bit value may be used to indicate one of two CS indexes in the indicated CS index group.

Preferably, a frequency hopping direction of the PUCCH may be determined as one of two directions based on a third bit value of the RI.

Preferably, the second RB offset, the CS index and the frequency hopping direction for the PUCCH may be determined to satisfy the following table:

| RI ($b_2b_1b_0$) | CCE-based 1 bit ($c_0$) | Second RB offset ($b_2$) | FH direction ($b_1$) | CS index ($b_0, c_0$) |
|---|---|---|---|---|
| 000 | 0 | 0 | First direction | 0 |
|  | 1 |  |  | 3 |
| 001 | 0 |  |  | 6 |
|  | 1 |  |  | 9 |
| 010 | 0 |  | Second direction | 0 |
|  | 1 |  |  | 3 |
| 011 | 0 |  |  | 6 |
|  | 1 |  |  | 9 |
| 100 | 0 | 1 | First direction | 0 |
|  | 1 |  |  | 3 |
| 101 | 0 |  |  | 6 |
|  | 1 |  |  | 9 |
| 110 | 0 |  | Second direction | 0 |
|  | 1 |  |  | 3 |
| 111 | 0 |  |  | 6 |
|  | 1 |  |  | 9 |

Herein, $b_2$ denotes the first bit value of the RI, $b_1$ denotes the third bit value of the RI, and $b_0$ denotes the second bit value of the RI, and a relationship between $b_2$ to $b_0$ and the first to third bit values of the RI is changeable.

Preferably, the control information may include Acknowledgement/Negative Acknowledgement (ACK/NACK) for downlink data scheduled by the PDCCH.

Advantageous Effects

According to the present invention, wireless signal transmission and reception may be efficiently performed in a wireless communication system.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

BEST MODE

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present invention, for simplicity, this technology will be referred to as NR (New Radio or New RAT).

For the sake of clarity, 3GPP NR is mainly described, but the technical idea of the present invention is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
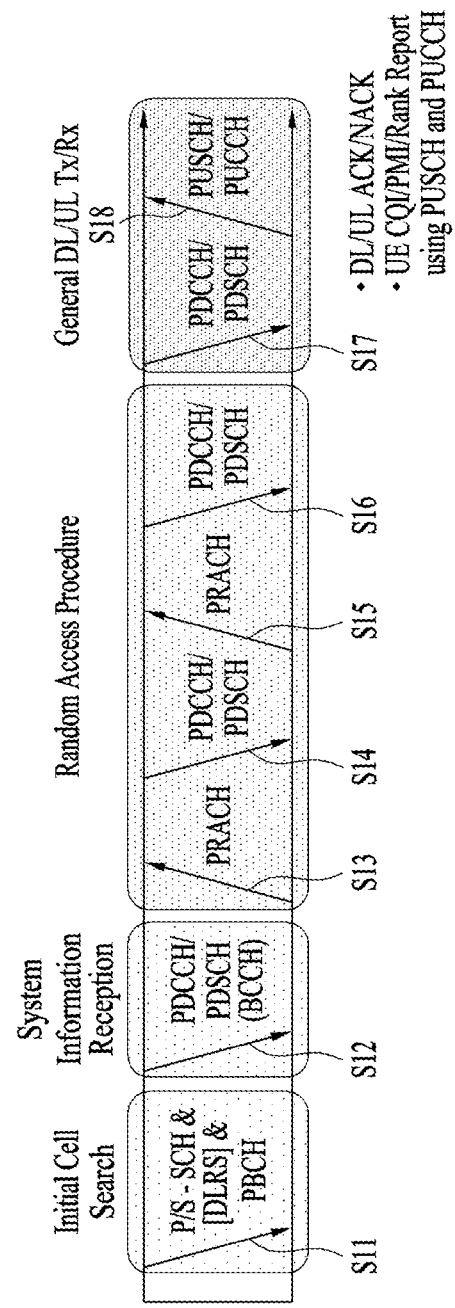
FIG. 1 illustrates physical channels used in a 3GPP system, which is an example of wireless communication systems, and a general signal transmission method using the same.

FIG. 1 illustrates physical channels used in a 3GPP NR system and a general signal transmission method using the same.

When powered on or when a UE initially enters a cell, the UE performs initial cell search involving synchronization with a BS in step S101. For initial cell search, the UE synchronizes with the BS and acquires information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
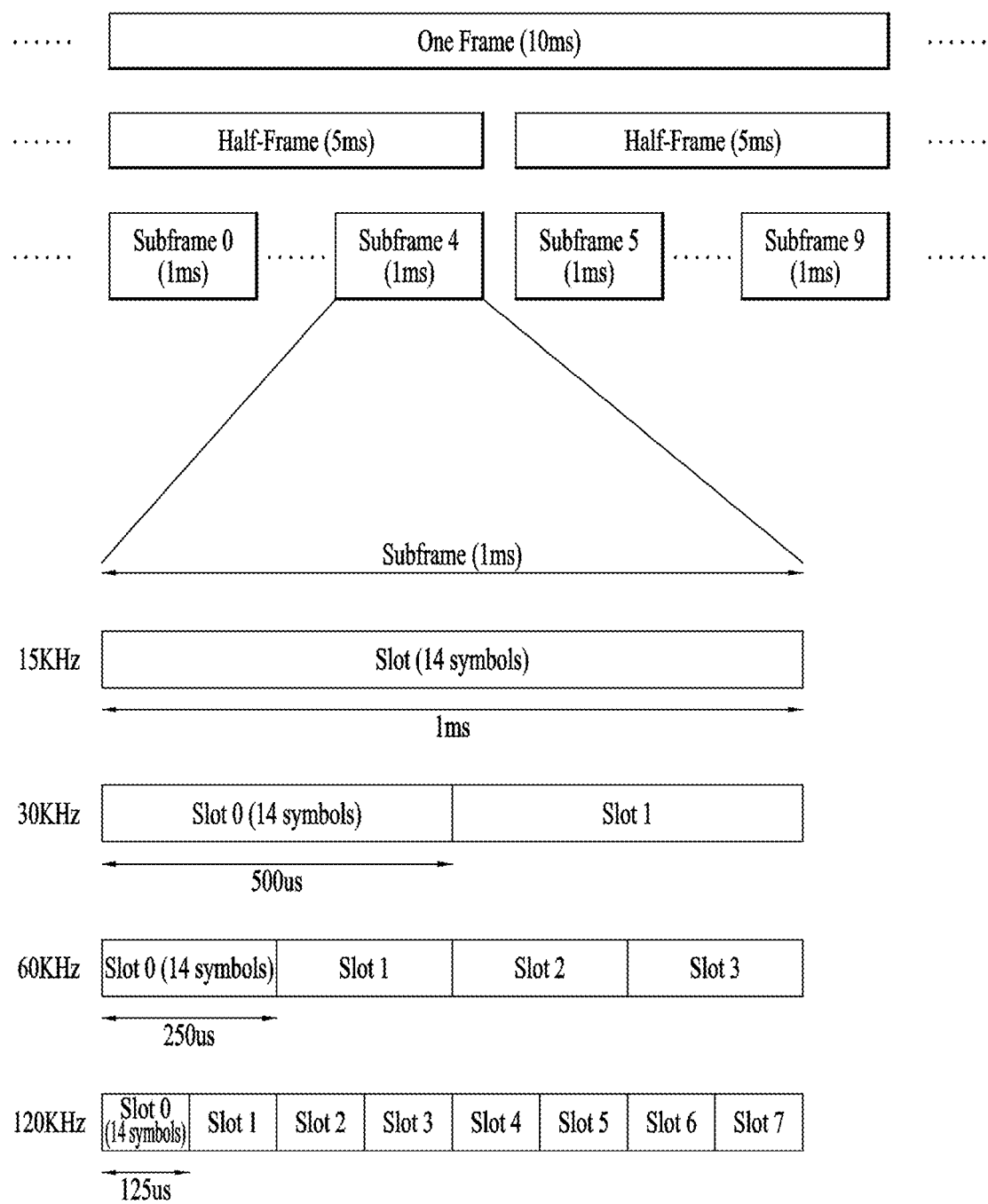
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame, u}_{slot}$: Number of slots in a frame
* $N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a Discrete Fourier Transform-spread-OFDM (DFT-s-OFDM) symbol).

Figure 3:
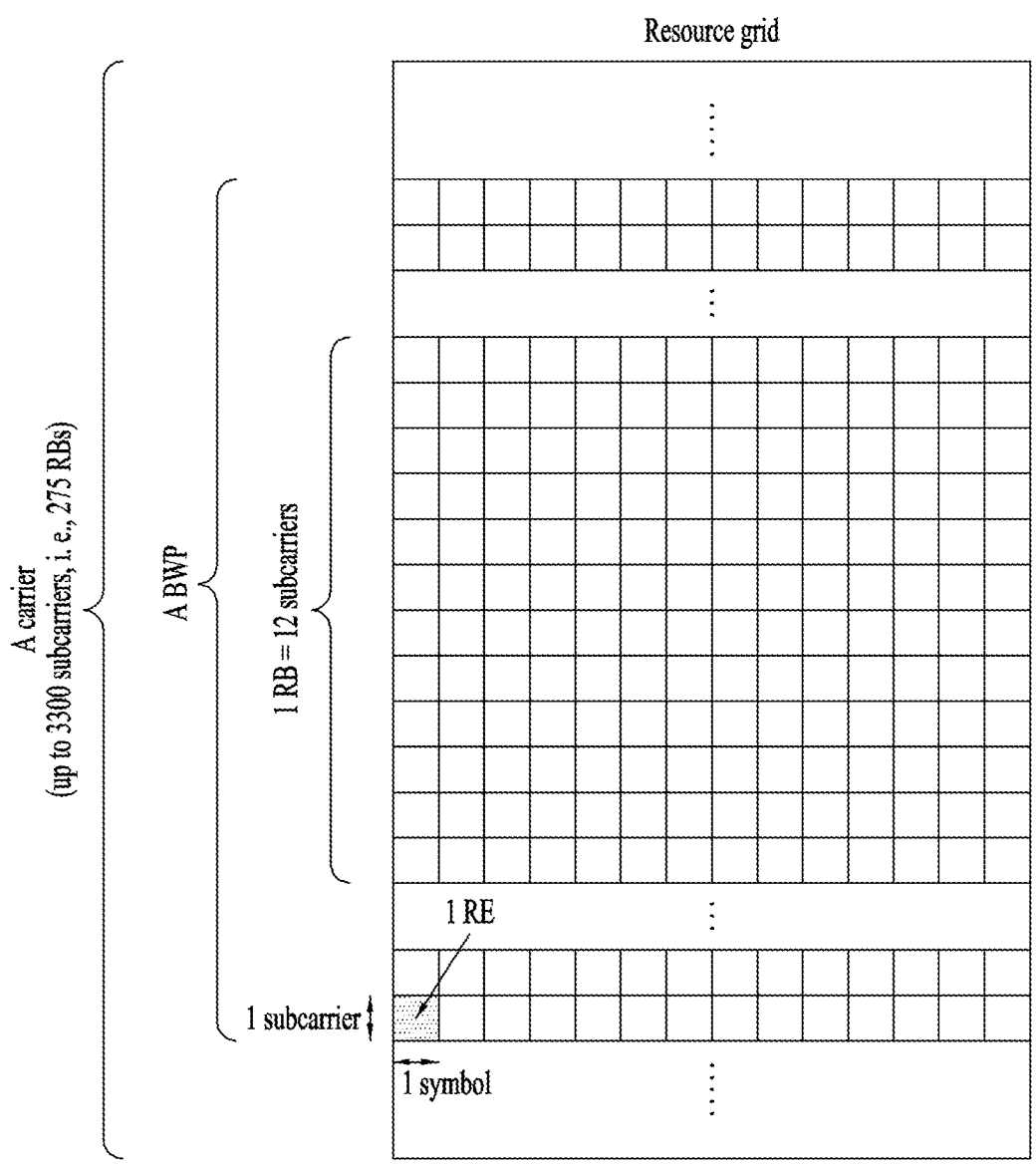
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
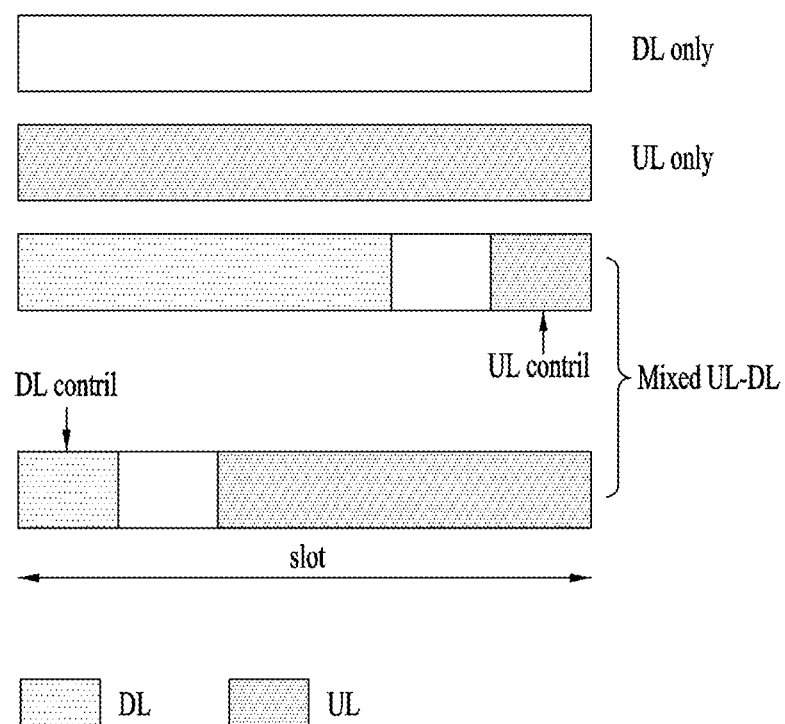
FIG. 4 illustrates a structure of a self-contained slot.

FIG. 4 illustrates a structure of a self-contained slot. In the NR system, a frame has a self-contained structure in which a DL control channel, DL or UL data, a UL control channel, and the like may all be included in one slot. For example, the first N symbols (hereinafter referred to as a DL control region) in a slot may be used to transmit a DL control channel, and the last M symbols (hereinafter referred to as a UL control region) in the slot may be used to transmit a UL control channel. N and M are integers greater than 0. A resource region between the DL control region and the UL control region (hereinafter referred to as a data region) may be used for DL data transmission or UL data transmission. There may be a time gap for DL-to-UL or UL-to-DL switching between the control region and the data region. For example, the following configurations may be considered. Corresponding intervals are listed in temporal order.
1. DL only configuration
2. UL only configuration
3. Mixed UL-DL configuration
   DL region+Guard Period (GP)+UL control region;
   DL control region+GP+UL region,
   DL region: (i) DL data region or (ii) DL control region+ DL data region;
   UL region: (i) UL data region or (ii) UL data region+UL control region.

Figure 5:
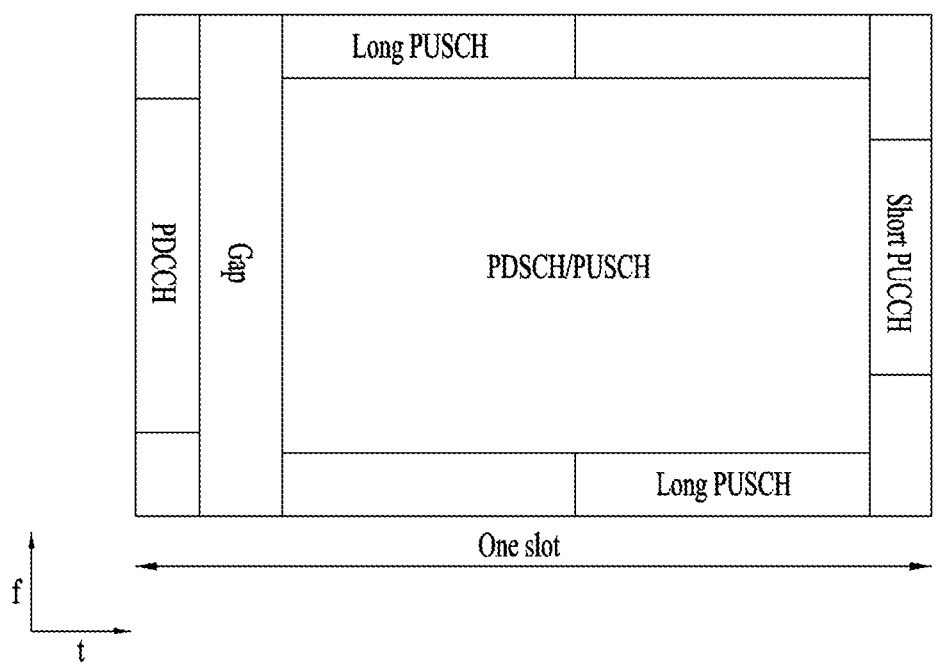
FIG. 5 illustrates an example in which a physical channel is mapped into a self-contained slot.

FIG. 5 illustrates an example in which a physical channel is mapped into a self-contained slot. A PDCCH may be transmitted in the DL control region, and a PDSCH may be transmitted in the DL data region. A PUCCH may be transmitted in the UL control region, and a PUSCH may be transmitted in the UL data region. The GP provides a time gap in the process of switching from the transmission mode to the reception mode or from the reception mode to the transmission mode. Some symbols at the time of switching from DL to UL within a subframe may be configured as the GP.

Hereinafter, each of the physical channels will be described in more detail.

The PDCCH carries Downlink Control Information (DCI). For example, the PCCCH (i.e., DCI) carries a transmission format and resource allocation of a downlink shared channel (DL-SCH), resource allocation information about an uplink shared channel (UL-SCH), paging information about a paging channel (PCH), system information present on the DL-SCH, resource allocation information about a higher layer control message such as a random access response transmitted on a PDSCH, a transmit power control command, and activation/release of configured scheduling (CS). The DCI includes a cyclic redundancy check (CRC). The CRC is masked/scrambled with different identifiers (e.g., Radio Network Temporary Identifier (RNTI)) according to the owner or usage of the PDCCH. For example, if the PDCCH is for a specific UE, the CRC will be masked with a UE identifier (e.g., Cell-RNTI (C-RNTI)). If the PDCCH is for paging, the CRC will be masked with a Paging-RNTI (P-RNTI). If the PDCCH is for system information (e.g., a system information block (SIB)), the CRC will be masked with a system information RNTI (SI-RNTI). If the PDCCH is for a random access response, the CRC will be masked with a random access-RNTI (RA-RNTI).

The PDCCH consists of 1, 2, 4, 8, or 16 Control Channel Elements (CCEs) depending on an aggregation level (AL).

To receive/detect a PDCCH, the UE monitors PDCCH candidates. The PDCCH candidates represent the CCE(s) that the UE should monitor for PDCCH detection. Each PDCCH candidate is defined as 1, 2, 4, 8, or 16 CCEs depending on the AL. The monitoring includes (blind) decoding of the PDCCH candidates. A set of PDCCH candidates monitored by the UE is defined as a PDCCH Search Space (SS). The SS includes a common search space (CSS) or a UE-specific search space (USS). The UE may acquire DCI by monitoring the PDCCH candidates in one or more SSs configured by the MIB or higher layer signaling. Each CORESET is associated with one or more SSs, and each of the SSs is associated with one COREST. The SSs may be defined based on the following parameters.

controlResourceSetId: Indicates a CORESET associated with an SS;

monitoringSlotPeriodicityAndOffset: Indicates a PDCCH monitoring periodicity (in units of slots) and a PDCCH monitoring interval offset (in units of slots);

monitoringSymbolsWithinSlot: Indicates PDCCH monitoring symbols in a slot (e.g. the first symbol(s) of the CORESET);

nrofCandidates: Indicates the number of PDCCH candidates (one of 0, 1, 2, 3, 4, 5, 6, and 8) for each AL={1, 2, 4, 8, 16}.

An occasion (e.g., time/frequency resources) in which PDCCH candidates should be monitored is defined as a PDCCH (monitoring) occasion. One or more PDCCH (monitoring) occasions may be configured in a slot.

Table 3 exemplarily shows the features of the respective search space types.

TABLE 3

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

The CCE is a logical allocation unit used to provide a PDCCH having a predetermined code rate according to a radio channel state. A CCE consists of 6 Resource Element Groups (REGs). An REG is defined by one OFDM symbol and one (P)RB. The PDCCH is transmitted through a Control Resource Set (CORESET). The CORESET is defined as an REG set having a given numerology (e.g., SCS, CP length). A plurality of CORESETs for one UE may overlap with each other in the time/frequency domain. A CORESET may be configured through system information (e.g., a Master Information Block (MIB)) or UE-specific higher layer (e.g. Radio Resource Control (RRC) layer) signaling. Specifically, the number of RBs and the number of OFDM symbols (a maximum of 3 OFDM symbols) that constitute the CORESET may be configured by higher layer signaling.

Table 4 exemplarily shows DCI formats transmitted on the PDCCH.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |

TABLE 4-continued

| DCI format | Usage |
|---|---|
| 2_3 | Transmission of a group of TPC commands for SRS transmissions by one or more UEs |

DCI format 0_0 may be used for scheduling of a TB-based (or TB-level) PUSCH, and DCI format 0_1 may be used for scheduling of a TB-based (or TB-level) PUSCH or a Code Block Group (CBG)-based (or CBG-level) PUSCH. DCI format 1_0 may be used for scheduling of a TB-based (or TB-level) PDSCH, and DCI format 1_1 may be used for scheduling of a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or UL scheduling information. DCI format 2_0 is used to deliver dynamic slot format information (e.g., dynamic SFI) to the UE, and DCI format 2_1 is used to deliver downlink pre-emption information to the UE. DCI format 2_0 and/or DCI format 2_1 may be delivered to UEs in a group on a group common PDCCH, which is a PDCCH delivered to UEs defined as one group.

DCI format 0_0 and DCI format 1_0 may be referred to as fallback DCI formats, and DCI format 0_1 and DCI format 1_1 may be referred to as non-fallback DCI formats. For the fallback DCI formats, the same DCI size/field configuration is maintained regardless of the UE configuration. On the other hand, for the non-fallback DCI formats, the DCI size/field configuration varies according to the UE configuration.

The PDSCH carries downlink data (e.g., DL-SCH transport block (DL-SCH TB)), and a modulation technique such as Quadrature Phase Shift Keying (QPSK), 16 Quadrature Amplitude Modulation (QAM), 64 QAM, or 256 QAM is applied thereto. The TB is encoded to generate a codeword. The PDSCH may carry a maximum of two codewords. Scrambling and modulation mapping may be performed on each codeword, and the modulation symbols generated from each codeword may be mapped to one or more layers. Each of the layers is mapped to a resource together with a Demodulation Reference Signal (DMRS) to generate an OFDM symbol signal and transmit the signal through a corresponding antenna port.

The PUCCH carries Uplink Control Information (UCI). The UCI includes the following information.

Scheduling Request (SR): Information that is used to request a UL-SCH resource.

Hybrid Automatic Repeat Request (HARQ)-Acknowledgment (ACK): A response to a downlink data packet (e.g., codeword) on the PDSCH. HARQ-ACK indicates whether the downlink data packet has been successfully received. In response to a single codeword, one bit of HARQ-ACK may be transmitted. In response to two codewords, two bits of HARQ-ACK may be transmitted. The HARQ-ACK response includes positive ACK (simply, ACK), negative ACK (NACK), DTX or NACK/DTX. Here, the HARQ-ACK is used interchangeably used with HARQ ACK/NACK and ACK/NACK.

Channel State Information (CSI): Feedback information about a downlink channel. Multiple Input Multiple Output (MIMO)-related feedback information includes a Rank Indicator (RI) and a Precoding Matrix Indicator (PMI).

Table 5 exemplarily shows PUCCH formats. PUCCH formats may be divided into Short PUCCHs (Formats 0 and 2) and Long PUCCHs (Formats 1, 3, and 4) based on the PUCCH transmission duration.

TABLE 5

| PUCCH format | Length in OFDM symbols $N^{PUCCH}_{symb}$ | Number of bits | Usage | Etc |
|---|---|---|---|---|
| 0 | 1-2 | =2 | HARQ, SR | Sequence selection |
| 1 | 4-14 | =2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM(no UE multiplexing) |
| 4 | 4-14 | >2 | HARQ, CSI, [SR] | DFT-s-OFDM(Pre DFT OCC) |

PUCCH format 0 carries UCI having a size of up to 2 bits, and is mapped based on a sequence and transmitted. Specifically, a UE transmits one of a plurality of sequences on a PUCCH corresponding to PUCCH format 0 to transmit specific UCI to the eNB. Only when transmitting a positive SR, the UE transmits a PUCCH corresponding to PUCCH format 0 within a PUCCH resource for the corresponding SR configuration.

PUCCH format 1 carries UCI having a size of up to 2 bits, and the modulation symbols therefor are spread by an orthogonal cover code (OCC) (configured differently depending on whether frequency hopping is performed) in the time domain. The DMRS is transmitted on a symbol on which a modulation symbol is not transmitted (namely, the DMRS is transmitted through time division multiplexing (TDM)).

PUCCH format 2 carries UCI having a bit size larger than 2 bits, and the modulation symbols are transmitted through frequency division multiplexing (FDM) with the DMRS. The DM-RS is positioned on symbol indexes #1, #4, #7 and #10 in a resource block given with a density of ⅓. A Pseudo Noise (PN) sequence is used for the DM_RS sequence. For two-symbol PUCCH format 2, frequency hopping may be enabled.

PUCCH format 3 is not subjected to UE multiplexing in the same physical resource block, but carries UCI having a bit size larger than 2 bits. In other words, the PUCCH resource of PUCCH format 3 does not include an OCC. The modulation symbols are transmitted through time division multiplexing (TDM) with the DMRS.

PUCCH format 4 supports multiplexing with up to 4 UEs in the same physical resource blocks and carries UCI having a bit size larger than 2 bits. In other words, the PUCCH resource of PUCCH format 3 includes an OCC. The modulation symbols are transmitted through time division multiplexing (TDM) with the DMRS.

The PUSCH carries uplink data (e.g., UL-SCH transport block (UL-SCH TB)) and/or uplink control information (UCI), and is transmitted based on a Cyclic Prefix-Orthogonal Frequency Division Multiplexing (CP-OFDM) waveform or a Discrete Fourier Transform-spread-Orthogonal Frequency Division Multiplexing (DFT-s-OFDM) waveform. When the PUSCH is transmitted based on the DFT-s-OFDM waveform, the UE applies transform precoding to transmit the PUSCH. For example, when the transform precoding is not allowed (e.g., the transform precoding is disabled), the UE may transmit the PUSCH based on the CP-OFDM waveform. When the transform precoding is allowed (e.g., the transform precoding is enabled), the UE may transmit the PUSCH based on the CD-OFDM waveform or the DFT-s-OFDM waveform. PUSCH transmission may be dynamically scheduled by the UL grant in the DCI or semi-statically scheduled based on higher layer (e.g., RRC) signaling (and/or Layer 1 (L1) signaling (e.g., PDCCH)) (configured grant). The PUSCH transmission may be performed on a codebook basis or on a non-codebook basis.

Figure 6:
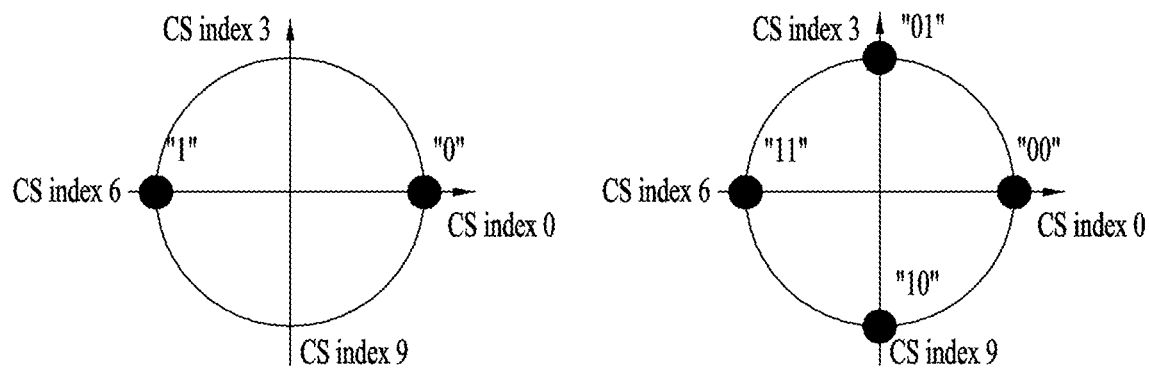
FIG. 6 illustrates a beam-based initial access procedure.

FIG. 6 illustrates the structure of PUCCH format 0. PUCCH format 0 consists of one PRB on the frequency axis and one or two OFDM-based symbols on the time axis. PUCCH format 0 consists of only sequences corresponding to UCI signals without DMRS. UCI information may be transmitted by selecting and transmitting one of a plurality of sequences. Referring to FIG. 6, a plurality of sequences to be transmitted on PUCCH format 0 may be separated by cyclic shift (CS), and the CS index may be varied depending on the UCI information. For example, when the value of 1-bit UCI is 0, CS index 0 may be used. When the value of the 1-bit UCI is 1, CS index 6 may be used. When the number of CS indexes is 12, up to 6 UEs may be multiplexed onto one PUCCH format 0. In this case, one UE may use one of {CS index X, CS index X+6} to transmit 1-bit UCI information. X may have a value from 0 to 5 and may be referred to as an initial CS index. Similarly, the UE may use one of {CS index X, CS index X+3, CS index X+6, CS index X+9} to transmit 2-bit UCI information (where X=0, 1, 2).

Figure 7:
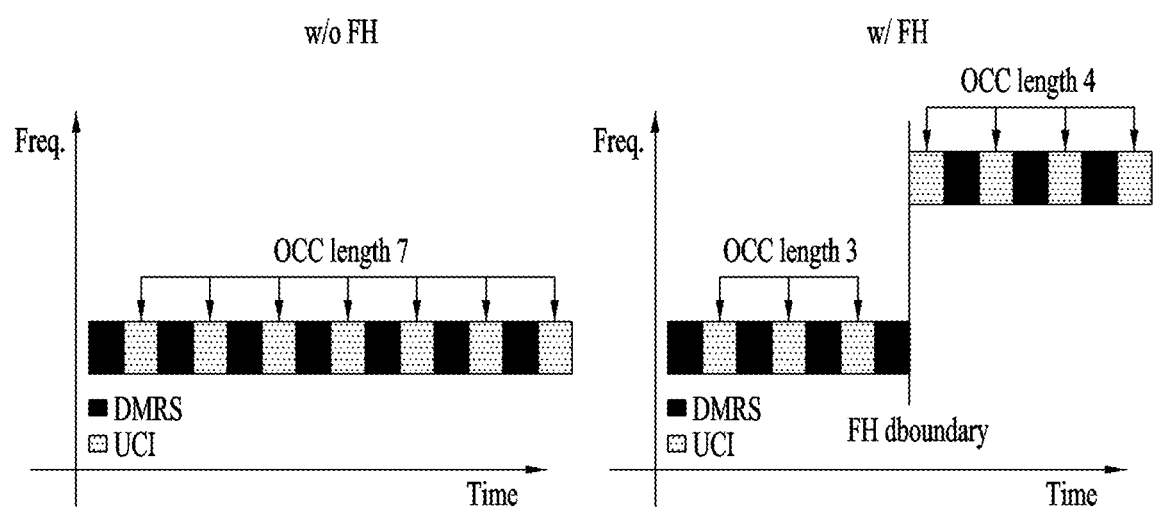
FIGS. 7 and 8 illustrate PUCCH formats 0 and 1.

FIG. 7 illustrates the structure of PUCCH format 1. PUCCH format 1 consists of one PRB on the frequency axis and 4 to 14 OFDM-based symbols on the time axis. In PUCCH format 1, DMRS and UCI are configured/mapped to different symbols in a TDM manner. A DMRS sequence of length 12 may be mapped to a DMRS symbol. A specific sequence of length 12 multiplied by a UCI modulation (e.g., QPSK) symbol is mapped to a UCI symbol. Here, the specific sequence may include a Computer-Generated Constant Amplitude Zero Auto Correlation (CG-CAZAC) sequence of length 12. In PUCCH format 1, a plurality of UEs may be multiplexed into the same PRB by applying CS (frequency-domain code)/OCC (time-domain spreading code) to both the UCI and the DMRS. In PUCCH format 1, frequency hopping (FH) may be applied in a slot. When FH is not applied, the symbols of PUCCH format 1 are transmitted within the same PRB. On the other hand, when FH is applied, a preceding part and a following part of the symbols of PUCCH format 1 may be transmitted on different PRBs. For example, when FH is applied, (1) the PUCCH may be transmitted on a PRB in a higher part of a UL band at the first frequency hop and be transmitted on a PRB in a lower part of the UL band at the second frequency hop, or (2) the PUCCH may be transmitted on a PRB in the lower part in the UL band at the first frequency hop and be transmitted on a PRB in the higher part of the UL band at the second frequency hop.

Figure 8:
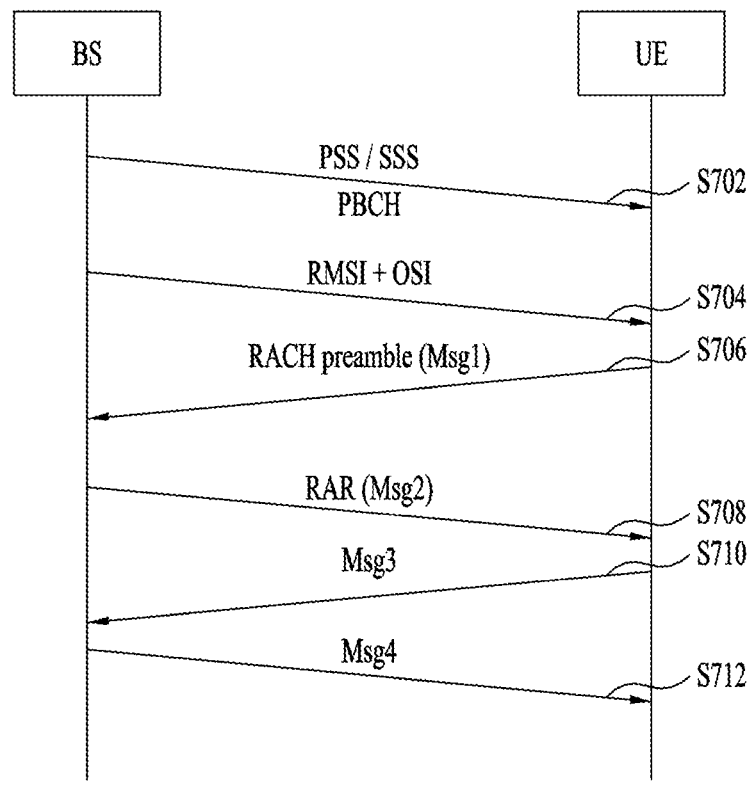

FIG. 8 illustrates a beam-based initial access procedure. In 3GPP NR, a physical channel or a reference signal may be transmitted using beamforming. In this case, the beams should be aligned/managed between the eNB and the UE in order to perform signal transmission/reception. In the Radio Resource Control (RRC) IDLE mode, beam alignment may be performed based on the SSB. In the RRC CONNECTED mode, on the other hand, beam alignment may be performed based on the CSI-RS (in DL) and the SRS (in UL).

Referring to FIG. 8, an eNB (e.g., a BS) may periodically transmit an SSB (S702). Here, the SSB includes PSS/SSS/PBCH. The SSB may be transmitted using beam sweeping. Thereafter, the eNB may transmit Remaining Minimum System Information (RMSI) and Other System Information (OSI) (S704). The RMSI may include information (e.g., PRACH configuration information) necessary for the UE to initially access the eNB. The UE performs SSB detection and then identifies the best SSB. Then, the UE may transmit an RACH preamble (Message 1 (Msg1)) to the eNB using the PRACH resource that is linked/correspond to the index (i.e., beam) of the best SSB (S706). The beam direction of the RACH preamble is associated with the PRACH resource. The association between the PRACH resource (and/or the RACH preamble) and the SSB (index) may be established through system information (e.g., RMSI). Then, as a part of the RACH procedure, the eNB transmits a Random Access Response (RAR) (Msg2) in response to the RACH preamble (S708). Specifically, the scheduling information about the RAR message may be CRC-masked with a Random Access-RNTI (RA-RNTI) and transmitted on the L1/L2 control channel (PDCCH). The PDCCH masked with RA-RNTI may only be transmitted through the common search space. Once the UE receives a scheduling signal masked with the RA-RNTI, the UE may receive the RAR message on the PDSCH indicated by the scheduling information. Thereafter, the UE checks whether there is random access response information indicated to the UE in the RAR message. Whether there is random access response information indicated to the UE may be checked by checking whether there is a Random Access Preamble ID (RAID) for the preamble transmitted by the UE. The random access response information includes timing offset information (e.g., Timing Advance Command (TAC)) for UL synchronization, UL scheduling information (e.g., UL grant), and UE temporary identification information (e.g., Temporary-C-RNTI (TC-RNTI)). Upon receiving the random access response information, the UE may transmit Msg3 (e.g., RRC Connection Request) on the PUCCH using the UL grant in the RAR (S710). Msg3 may include a UE identity for contention resolution. Thereafter, the eNB may transmit a contention resolution message Msg4 (S720). Msg4 may include RRC Connection Setup.

Figure 9:
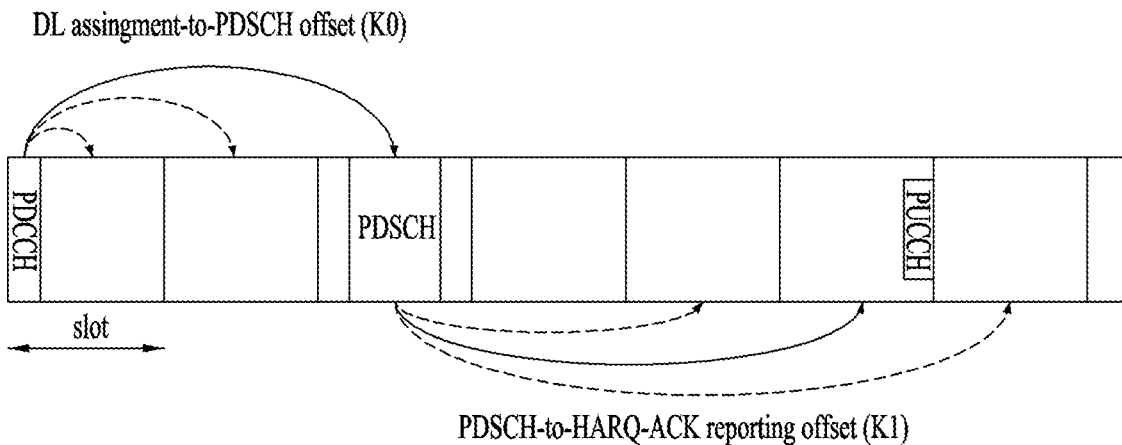
FIG. 9 illustrates an ACK/NACK transmission procedure.

FIG. 9 illustrates an ACK/NACK transmission procedure. Referring to FIG. 9, the UE may detect a PDCCH in slot # n. Here, the PDCCH includes downlink scheduling information (e.g., DCI format 1_0 or 1_1). The PDCCH indicates a DL assignment-to-PDSCH offset (K0) and a PDSCH-HARQ-ACK reporting offset (K1). For example, DCI format 1_0 or 1_1 may include the following information.

Frequency domain resource assignment: Indicates an RB set assigned to the PDSCH.

Time domain resource assignment: Indicates K0 and the starting position (e.g. OFDM symbol index) and duration (e.g. the number of OFDM symbols) of the PDSCH in a slot.

PDSCH-to-HARQ_feedback timing indicator: Indicates K1.

After receiving the PDSCH in slot #(n+K0) according to the scheduling information of slot # n, the UE may transmit UCI on the PUCCH in slot #(n+K1). Here, the UCI includes a HARQ-ACK response to the PDSCH. In the case where the PDSCH is configured to transmit a maximum of one TB, the HARQ-ACK response may be configured in one bit. In the case where the PDSCH is configured to transmit a maximum of two TBs, the HARQ-ACK response may be configured in two bits if spatial bundling is not configured and may be configured in one bit if spatial bundling is configured. When slot #(n+K1) is designated as a HARQ-ACK transmission time for a plurality of PDSCHs, the UCI transmitted in slot #(n+K1) includes a HARQ-ACK response to the plurality of PDSCHs.

Embodiment: PUCCH Resource Allocation

In the NR system, UCI is transmitted on the PUCCH. The UCI includes HARQ-ACK, SR, and CSI. As an example of allocating PUCCH resources, the eNB may configure a plurality of PUCCH resource sets for the UE, and the UE may select a specific PUCCH resource set corresponding to a specific range according to a range of the UCI (payload) size (e.g., the number of UCI bits). For example, the UE may select one of the following PUCCH resource sets according to the number of UCI bits $N_{UCI}$. Here, the PUCCH resource set represents a UE-dedicated (or UE-specific) PUCCH resource set. The UE-dedicated PUCCH resource set may be configured as part of the RRC connection procedure or configured through UE-specific higher layer (e.g., RRC) signaling after the RRC connection procedure is completed.

PUCCH resource set #0, if $N_{UCI} \leq 2$;
PUCCH resource set #1, if $2 < N_{UCI} \leq N_1$;
. . . ;
PUCCH resource set #(K−1), if $N_{K-2} < N_{UCI} \leq N_{K-1}$.

Here, K denotes the number of PUCCH resource sets (K>1), and $N_i$ is the maximum number of UCI bits supported by PUCCH resource set # i. For example, PUCCH resource set #1 may be composed of resources of PUCCH formats 0 to 1, and the other PUCCH resource sets may be composed of resources of PUCCH formats 2 to 4 (see Table 5).

Then, the eNB may transmit DCI to the UE on the PDCCH and may indicate, through an ACK/NACK Resource Indicator (ARI) in the DCI, a PUCCH resource to be utilized for UCI transmission in a specific PUCCH resource set. The ARI may be used to indicate a PUCCH resource for ACK/NACK transmission and may be referred to as a PUCCH Resource Indicator (PRI). Here, the DCI may be DCI used for PDSCH scheduling, and the UCI may include HARQ-ACK for the PDSCH. For simplicity, the method of explicitly indicating a specific PUCCH resource in the PUCCH resource set using the ARI is referred to as a one-step PUCCH Resource Allocation (RA) scheme.

In addition, the eNB may configure a PUCCH resource set including PUCCH resources the number of which is larger than the number of states representable by the ARI for the UE, using a (UE-specific) higher layer (e.g., RRC) signal. In this case, the ARI may indicate a PUCCH resource subset in the PUCCH resource set, and a PUCCH resource to be used in the indicated PUCCH resource subset may be determined according to an implicit rule which is based on transmission resource information about the PDSCH and/or the PDCCH (e.g., a starting PRB index of the PDSCH, a starting CCE index of the PDCCH, and the like). For simplicity, the method of indicating a PUCCH resource subset with the ARI and determining a specific PUCCH resource in the indicated PUCCH resource subset according to an implicit rule is referred to as a two-step PUCCH RA scheme.

Hereinafter, a method for more efficiently allocating PUCCH resources using DL control information (e.g., DCI) and an implicit rule will be described.

In the present invention, a PUCCH resource may refer to a physical resource configured with, for example, at least one of the followings: a (OFDM) symbol position at which PUCCH transmission starts, a time duration or the number of symbols for which PUCCH transmission continues, frequency domain resource allocation information (e.g., a starting position of a (P)RB allocation resource and the number of allocated (P)RBs), information about whether frequency hopping is used, a cyclic shift (CS) index, and/or an orthogonal cover code (OCC) index/length.

For example, the PUCCH resources may be classified according to the PUCCH formats as follows.

TABLE 6

| | | PUCCH format 0 | PUCCH format 1 | PUCCH format 2 | PUCCH format 3 | PUCCH format 4 |
|---|---|---|---|---|---|---|
| Frequency resource of 2nd hop if frequency hopping is enabled | Value range | 0~274 | 0~274 | 0~274 | 0~274 | 0~274 |
| Index of initial cyclic shift | Configurability | ○ | ○ | X | X | X |
| | Value range | 0~11 | 0~11 | — | — | — |
| Index of time-domain OCC | Configurability | X | ○ | X | X | X |
| | Value range | — | 0~6 | — | — | — |
| Length of Pre-DFT OCC | Configurability | X | X | X | X | ○ |
| | Value range | — | — | — | — | 2, 4 |
| Index of Pre-DFT OCC | Configurability | X | X | X | X | ○ |
| | Value range | — | — | — | — | 0~3 |

In addition, the following terms are used in the present invention.

PUCCH resource set: A set in which element(s) corresponds to a PUCCH resource. For example, the PUCCH resource set may be {PUCCH resource #0, PUCCH resource #1, . . . , PUCCH resource #(K−1)}. Here, the PUCCH resource set may be composed of K individual PUCCH resources. In addition, the PUCCH resource set may be composed of PUCCH-related parameter(s) that may be used to identify/define a plurality of PUCCH resources. In this case, the K PUCCH resources may be identified/defined based on the PUCCH-related parameter(s).

PUCCH resource subset: A subset of a PUCCH resource set. For example, the PUCCH resource set may be {PUCCH resource subset #0, PUCCH resource subset #1, . . . , PUCCH resource subset #(L−1)}. A PUCCH resource subset may consist of one or more, preferably a plurality of, PUCCH resources.

(PDSCH scheduling) DCI: DCI for scheduling a PDSCH (see FIG. 7). For example, the DCI includes DCI format 1_0 and DCI format 1_1. The DCI is transmitted on the PDCCH.

Implicit mapping: Mapping transmission resource information about the PDSCH and/or PDCCH (e.g., the starting PRB index of the PDSCH, the starting CCE index of the PDCCH, etc.) to Z bit values based on an implicit rule. For example, Z may be 1. In this case, the value of Z may be determined to be 0 or 1 depending on which of the two CCE sets the starting CCE index belongs to (e.g., an odd-numbered CCE set, an even-numbered CCE set).

Fallback DCI format: A DCI format (e.g., DCI format 1_0) in which the DCI size/field configuration remains the same regardless of the UE configuration.

Non-fallback DCI format: A DCI format (e.g., DCI format 1_1) in which the DCI size/field configuration varies according to the UE configuration.

Semi-static HARQ-ACK codebook: This refers to a case where the size of a HARQ-ACK payload to be reported by the UE is semi-statically configured by a (UE-specific) higher layer (e.g., RRC) signal.

Dynamic HARQ-ACK codebook: This refers to a case where the size of a HARQ-ACK payload to be reported by the UE is dynamically changeable by DCI or the like. The HARQ-ACK payload size may be dynamically changed by c-DAI (and t-DAI).

Counter downlink assignment index (c-DAI): A specific index value in DCI (e.g., DL scheduling DCI) that indicates an order of (scheduled) PDSCHs (or TBs or code block groups (CBGs)). In configuring a HARQ-ACK payload, the HARQ-ACK input bits may be configured in the c-DAI order.

Total DAI (t-DAI): A specific index value in DCI (e.g., DL scheduling DCI) that indicates the total number of PDSCHs (or TBs or CBGs) subjected to HARQ-ACK reporting. The UE may determine the size of the HARQ-ACK payload based on the t-DAI.

Short PUCCH: A PUCCH having a transmission length of one or two symbols. For example, PUCCH formats 0 and 2 correspond to the short PUCCH (see Table 5).

Long PUCCH: A PUCCH whose transmission length is 4 to 14 symbols. For example, PUCCH formats 1, 3 and 4 correspond to the long PUCCH (see Table 5).

For simplicity, proposed schemes are separately described, but each proposed scheme may be combined with other proposed schemes of the present invention unless they do not contradict each other.

[Proposed Scheme #1]

In the New RAT system, the system bandwidth in a carrier is very large, and accordingly may not be fully utilized depending on the RF characteristics of the UE. Therefore, the entire system bandwidth may be divided into a plurality of bandwidth parts (BWPs). Referring to FIG. 3, a BWP is defined as a plurality of consecutive physical RBs (PRBs) in the frequency domain and may correspond to one numerology (e.g., SCS, CP length, etc.). A carrier may include up to N (e.g., 5) BWPs. Data communication may be performed through an activated BWP, and only one BWP may be activated for one UE.

When the base station indicates a HARQ-ACK transmission PUCCH resource corresponding to PDSCH transmission through (PDSCH scheduling) DCI, the UL BWP that is valid at the reception time of the PDSCH may differ from the UL BWP that is valid at the transmission time of a corresponding HARQ-ACK transmission PUCCH resource. In order to support the above-described operation, the base station needs to signal, to the UE, information about a BWP in which the PUCCH resource is transmitted.

In order to address the above-described issue, it is proposed that the base station signal, to the UE, BWP information about a specific PUCCH resource using at least one of the following methods.

(1) BWP information may be configured for each PUCCH resource. That is, in configuring PUCCH resources, the information about a BWP in which a PUCCH is to be transmitted may be configured for each PUCCH resource.

(2) The BWP in which a PUCCH resource is to be transmitted may be indicated through the DCI. Here, the DCI may be (PDSCH scheduling) DCI or group-common DCI.

[Proposed Scheme #2]

In the NR system, c-DAI may be used to configure a HARQ-ACK payload when the UE transmits HARQ-ACK information corresponding to a plurality of PDSCHs using a single PUCCH resource. If RRC connection setup has not been made after the UE made an initial access, the UE may not perform the operation of transmitting HARQ-ACKs for multiple PDSCHs using a single PUCCH resource. In particular, a PUCCH resource used prior to the RRC connection setup may only transmit a HARQ-ACK bit (e.g., a maximum of 1 bit) corresponding to a single PDSCH. However, if there is a bit field for c-DAI (hereinafter, field A) in the (DL scheduling) DCI (e.g., DCI format 1_0) for performing a fallback operation (hereinafter, fallback DCI), field A may always be present in the fallback DCI to maintain a constant DCI size. In this case, prior to the RRC connection setup, field A may not be used for the DAI and may be used for other purposes. Accordingly, in the present invention, when there is a field (hereinafter, field B) for indicating a PUCCH resource in the (DL scheduling) DCI, field A may be added to field B prior to the RRC connection setup to extend the bit width for indicating a PUCCH resource. On the other hand, after the RRC connection setup, field A and field B may be used for c-DAI and PUCCH resource indication, respectively.

Alternatively, if a (UE-specific) PUCCH resource set (of K or more bits) (e.g., K>2) that supports HARQ-ACK transmission for multiple PDSCHs is not configured for the UE, the c-DAI may be used for other purposes. Accordingly, before the (UE-specific) PUCCH resource set is configured for the UE, the bit width of the PUCCH resource indication field may be extended by adding field A to field B. On the other hand, after the (UE-specific) PUCCH resource set is configured for the UE, field A and field B may be used for c-DAI and PUCCH resource indication, respectively.

Specifically, when an X1-bit field (hereinafter, field A) and an X2-bit field (hereinafter, field B) are included in the (DL scheduling) DCI, the use of field A and field B may be changed according to the following conditions.

(1) Opt. 1: Changing the use depending on whether or not the RRC connection setup is made A. Prior to the RRC connection setup i. Use field A+field B to indicate a PUCCH resource (in a PUCCH resource set)

B. After the RRC connection setup i. Use field A for DAI (e.g., c-DAI) and field B for indication of a PUCCH resource (in the PUCCH resource set).

(2) Opt. 2: Changing the use depending on whether a (UE-specific) PUCCH resource set (of K or more bits) is configured A. Before a (UE-specific) PUCCH resource set is configured (when the set is not configured)

i. Use field A+field B to indicate a PUCCH resource (in the PUCCH resource set).

B. After a (UE-specific) PUCCH resource set is configured (when the set is configured)

i. Use field A for DAI (e.g., c-DAI) and field B for indication of a PUCCH resource (in the PUCCH resource set).

Here, the number of resources in the PUCCH resource set prior to the RRC connection setup (or prior to configuration of the (UE-specific) PUCCH resource set) may be set to be larger than the number of resources in the PUCCH resource set after the RRC connection setup (or after configuration of the (UE-specific) PUCCH resource set), in proportion to the number of bits of field A or the number of states representable by field A.

In addition, bit(s) (hereinafter unused bit(s)) that remain unused in the DCI until the RRC connection setup may be used to provide additional information about a reference PUCCH resource. Here, the reference PUCCH resource may be a PUCCH resource determined by system information (e.g., RMSI), a PUCCH resource indicator (ARI or PRI) (in the DCI), and/or a (DCI (starting) CCE index-based) implicit mapping, without an aid of the unused bit(s).

As an example, the additional information may be one or more of the followings.

(1) An additional PRB (index) offset, or a CS (value) offset,0 or an OCC (index) offset for the PUCCH resource;

(2) An additional starting symbol (index) offset for the PUCCH resource

A. In one example, if the reference PUCCH resource is a short PUCCH (e.g., PUCCH format 0), the UE may interpret the unused bit(s) (in the DCI) as additionally indicating a starting symbol offset with respect to the reference PUCCH resource;

(3) Indication of whether multi-slot transmission is performed for the PUCCH resource, A. In one example, if the reference PUCCH resource is a long PUCCH (e.g., PUCCH format 1), the UE interpret the unused bit(s) (in the DCI) as indicating whether multi-slot transmission is performed (e.g., '0' for single-slot transmission and '1' for multi-slot transmission). In this case, the number of slots constituting a multi-slot PUCCH may be defined as the least value (greater than 1) or the greatest value among the configurable values. Alternatively, the unused bit(s) (in DCI) may indicate the number of slots constituting the PUCCH;

(4) An additional offset for an index indicating a PUCCH resource set,

A. In one example, when the PUCCH resource set is indicated by an RMSI bit (as system information), the UE may interpret the unused bit(s) (in the DCI) as indicating an additional offset for a state indicated by the RMSI bit. That is, the base station may change the PUCCH resource set through the unused bit(s).

In the NR system, prior to the RRC connection setup, it is assumed that the size of the HARQ-ACK bit(s) to be reported by the UE is 1 bit. If the HARQ-ACK payload size is fixed prior to the RRC connection setup, the c-DAI field configured in a DL scheduling DCI format may be unused (for the purpose of dynamic change of the number of HARQ-ACK bit(s)). If a (single-slot) PUCCH resource is indicated by the system information (e.g., RMSI), a PUCCH resource indicator (ARI or PRI) and/or (DCI CCE index-based) implicit mapping prior to the RRC connection setup, the c-DAI field may be used to provide additional information about the (single-slot) PUCCH. As an example, the c-DAI field may provide one or more of the following information items:

(1) An additional PRB (index) offset, or CS (value) offset, or an OCC (index) offset for the PUCCH resource;

(2) An additional starting symbol (index) offset for the PUCCH resource;

(3) Indication of presence of whether multi-slot transmission is performed for the PUCCH resource;

(4) An additional offset for an index indicating a PUCCH resource set

[Proposed Scheme #3]

A PUCCH format 0/1 (hereinafter, PUCCH F0/F1) resource may be provided prior to the RRC connection setup because the UE will transmit HARQ-ACK of a maximum of 1 bit. Parameters for specifying a PUCCH F0/F1 resource may include a PUCCH transmission duration, a PUCCH transmission starting symbol, a CS (Cyclic), an Orthogonal Cover Code (OCC), and a Resource Block (RB) (e.g., Physical Resource Block (PRB)). In this case, a PUCCH resource allocation procedure including Step 1 of configuring $2^X$ PUCCH resource sets using an X-bit indicator in the RMSI, Step 2 of indicating a subset of a PUCCH resource set (configured in the first step) through a Y-bit (e.g., ARI, PRI) in the DCI, and Step 3 of indicating one PUCCH resource in the PUCCH resource subset (indicated in Step 2) using implicit mapping capable of representing Z-states may be considered. The next consideration may be parameters determined for the PUCCH resource in each step.

For example, when the UE transmits HARQ-ACK for the PDSCH on PUCCH F0/F1 before RRC connection, PUCCH F0/F1 resources may be configured as follows.

(1) Opt. 1

A. Step 1: One of $2^X$ PUCCH resource sets (of PUCCH F0/F1 resources) may be configured for the UE using an X-bit indicator in the system information.

i. Each PUCCH resource set may limit the PUCCH duration (and/or the PUCCH starting symbol) to a single value. Here, the symbol may include an OFDM-based symbol (e.g., an OFDM symbol or an SC-FDMA symbol).

ii. Each PUCCH resource set may limit PUCCH transmission PRB resources to a specific PRB region. Here, the PRB region may be proportional to the (initial) UL BWP bandwidth. The (initial) UL BWP may refer to an (initial) UL band in which the UE transmits PUCCH. In addition, the PRB region may be represented by parameter K and a frequency hopping (FH) direction. Here, K may be a parameter indicating that the PUCCH transmission PRB is spaced apart from the boundary of the band (e.g., the initial UL BWP) by K PRBs. The FH direction may indicate that the frequency resources are changed from a low frequency to a high frequency or from a high frequency to a low frequency (i.e., in two directions). Different PUCCH resource sets may correspond to different PRB regions.

B. Step 2: One of the $2^Y$ subsets in the PUCCH resource set (configured in Step 1) may be indicated to the UE through the Y-bit field in the DCI. Here, the value of the Y-bit field in the DCI may limit PUCCH transmission CS (and/or OCC) resources to a single value. The value of the Y-bit field in the DCI may also limit PUCCH transmission PRB resources to a (smaller) specific PRB region.

C. Step 3: One of the Z PUCCH resources in the PUCCH resource subset (indicated in Step 2) may be indicated through implicit mapping capable of representing the Z-states.

(2) Opt. 2

A. Step 1: One of $2^X$ PUCCH resource sets (of PUCCH F0/F1 resources) may be configured for the UE using an X-bit indicator in the system information. Each PUCCH resource set may limit PUCCH transmission PRB resources to a specific PRB region. Here, the PRB region may be proportional to the (initial) UL BWP bandwidth. In addition, the PRB region may be represented by parameter K and an FH direction. Here, K may be a parameter indicating that the PUCCH transmission PRB is spaced apart from the boundary of the band (e.g., the initial UL BWP) by K PRBs. The FH direction may indicate that the frequency resources are changed from a low frequency to a high frequency or from a high frequency to a low frequency (i.e., in two directions). Different PUCCH resource sets may correspond to different PRB regions.

B. Step 2: One of the $2^Y$ subsets in the PUCCH resource set (configured in Step 1) may be indicated to the UE through the Y-bit field in the DCI. Here, the value of the Y-bit field in the DCI may limit the PUCCH duration (and/or the PUCCH starting symbol) to a single value. In addition, the value of the Y-bit field in the DCI may limit PUCCH transmission CS (and/or OCC) resources to a single value. The value of the Y-bit field in the DCI may also limit PUCCH transmission PRB resources to a (smaller) specific PRB region.

C. Step 3: One of the Z PUCCH resources in the PUCCH resource subset (indicated in Step 2) may be indicated through implicit mapping capable of representing the Z-states.

In Opts. 1 and 2, the system information may refer to the RMSI (in the NR system). In addition, the starting symbol position of the PUCCH resource may be determined according to the PUCCH duration value. Further, the OCC index of the PUCCH resource may be determined according to the CS index value or may be predetermined. X is a positive integer and may be, for example, 4. Y is a positive integer and may be, for example, 2. Z may be 1, and if Z is greater than 1, the implicit indication may be expressed as a function of at least the CCE index (e.g., the starting CCE index used for PDCCH transmission).

In Step 1, considering that the PUCCH resource set should be available to a plurality of UEs in the cell, elements into which multiplexing is easily performed may be configured as the PUCCH resources. That is, the same PUCCH duration and the same PUCCH starting symbol may be configured for each PUCCH resource (Opt. 1). In addition, when the dynamic TDD configuration is excessive, the PUCCH duration may be dynamically changed by the DCI (Opt. 2). In addition, the system information may indicate potential PRB resources to a PUCCH resource that is representable by parameter K (e.g., a parameter indicating that the PUCCH transmission PRB is spaced apart from the boundary of the band (e.g., the initial UL BWP) by K PRBs) and the FH direction. The number of candidate values for K may be fixed or varied according to the bandwidth of the initial UL BWP.

In Step 2, when UE multiplexing is controlled with the DCI, the number of PRB resources that may be subjected to FDM may be limited or changed, while the number of CSs (and/or OCCs) that may be subjected to CDM always has a fixed value. Accordingly, it may be preferred to fully adjust the CS/OCC values with the DCI. For example, the CS indexes for PUCCH F0 and PUCCH F1 may be {0, 3, 6, 9} and {0, 3}, respectively. In this case, the DCI may indicate one of the CS values, and the OCC index may be implicitly determined by the CS index. In an example, an OCC index corresponding to (k mod OCC length) may correspond to the k-th CS index. Alternatively, the OCC index may have a predetermined value. Thereafter, in Step 3, one of the PUCCH resource candidates having a (single) specific CS value in a specific PRB region may be selected in an implicit mapping manner. That is, one PRB resource may be selected from among a plurality of PRB candidates.

Table 7 exemplarily shows PUCCH resource sets indicated by the system information. For example, one of 16 PUCCH resource sets may be indicated by a 4-bit indicator in the RMSI. Symbol ↑ denotes frequency hopping from a low frequency to a high frequency, and symbol ↓ denotes frequency hopping from a high frequency a low frequency.

TABLE 7

| 4-bit RMSI | PUCCH duration | Stating symbol | K value(s) | Freq. hopping |
|---|---|---|---|---|
| 0000 | 2 | 12 | {0, 1} | {↑, ↓} |
| 0001 | 2 | 12 | {2, 3} | {↑, ↓} |
| 0010 | 2 | 12 | {4, 5} | {↑, ↓} |
| 0011 | 2 | 12 | {6, 7} | {↑, ↓} |
| 0100 | 4 | 5 | {0} | {↑, ↓} |
| 0101 | 4 | 5 | {1} | {↑, ↓} |
| 0110 | 4 | 5 | {2} | {↑, ↓} |
| 0111 | 4 | 5 | {3} | {↑, ↓} |
| 1000 | 10 | 2 | {0} | {↑, ↓} |
| 1001 | 10 | 2 | {1} | {↑, ↓} |
| 1010 | 10 | 2 | {2} | {↑, ↓} |
| 1011 | 10 | 2 | {3} | {↑, ↓} |
| 1100 | 14 | 0 | {0} | {↑, ↓} |
| 1101 | 14 | 0 | {1} | {↑, ↓} |
| 1110 | 14 | 0 | {2} | {↑, ↓} |
| 1111 | 14 | 0 | {3} | {↑, ↓} |

Table 8 exemplarily shows information indicated by a 2-bit ARI in DCI for PUCCH F0 and PUCCH F1, respectively. $K_1$ and $K_2$ denote values of two K values for PUCCH F0 through the RMSI, respectively, and L denotes the OCC length.

TABLE 8

| 2-bit ARI | PUCCH F0 | | PUCCH F1 | |
|---|---|---|---|---|
| | CS index | {$K_1$, $K_2$} | CS index | OCC index |
| 00 | 0 | $K_1$ | 0 | 0 mod L |
| 01 | 0 | $K_2$ | 3 | 1 mod L |
| 10 | 3 | $K_1$ | 6 | 2 mod L |
| 11 | 3 | $K_2$ | 9 | 3 mod L |

Table 9 shows an example of indicating a frequency hopping direction through 1-bit implicit mapping. As an example, the 1-bit implicit mapping may include mapping the index of the starting CCE of one or more CCEs used for PDCCH transmission to 0 or 1.

TABLE 9

| 1-bit implicit. | Freq. hopping |
|---|---|
| 0 | ↑ |
| 1 | ↓ |

As a variation on the above-described method, for PUCCH F0, a combination of (CS, FH direction) may be designated using a specific bit field (e.g., ARI) in the DL grant DCI, and the value of K may be indicated through implicit mapping. In PUCCH F0, CS indexes 0 and 3 may correspond to ACK and NACK (or NACK and ACK), respectively, or CS indexes 6 and 9 may correspond to ACK and NACK (or NACK and ACK), respectively. In the above case, CS indexes 0 and 6 (or 3 and 9) may correspond to ACK. For PUCCH F1, a combination of (CS, OCC) may be designated using a specific bit field (e.g., ARI) in the DL grant DCI, and a combination of (K, FH) may be indicated through implicit mapping.

In addition, before the UE receives signaling of a (dedicated) PUCCH resource configuration, the base station may configure a PUCCH resource set (conforming to PUCCH F0 or PUCCH F1) for the UE through the system information, and then indicate, through a 3-bit field in the DCI and 1-bit information according to the CCE index-based implicit indication, a PUCCH resource to be actually used for transmission of UCI (e.g., HARQ-ACK). In this case, it is proposed that the 3-bit field in the DCI and the 1-bit implicit indication be used for PUCCH F0 or PUCCH F1 as follows. Here, for the PUCCH resource set, refer to the above-described details. The DCI includes DL grant DCI (e.g., DCI format 1_0 or 1_1).

(1) For PUCCH F0,
  A. 3-bits (e.g., ARI, PRI) in the DCI
    i. It may indicate one of two PRB offsets (1 bit).
    ii. It may indicate one of two frequency hopping directions (1 bit).
    iii. It may indicate one of two starting symbol indexes (in a slot) (1 bit). The two starting symbol indexes may be {10, 12} or {11, 12}. Here, the symbols may include an OFDM-based symbol (e.g., an OFDM symbol or an SC-FDMA symbol).
  B. 1-bit implicit indication
    i. It may indicate one of two initial CS index values (1 bit). As an example, the two initial CS index values may be {0, 3}.

(2) For PUCCH F1,
  A. 3-bit (e.g., ARI, PRI) in DCI
    i. It may indicate one of two PRB offsets (1 bit).
    ii. It may indicate one of two frequency hopping directions (1 bit).
    iii. It may indicate one of two initial CS index groups (1 bit). As an example, two initial CS index groups may be designated as {0, 3} and {6, 9}, or as {0, 6} and {3, 9}.
  B. 1-bit implicit indication
    i. It may indicate one of two values (in the initial CS index group indicated by the DCI). If {0, 3} is designated between the two initial CS index groups {0, 3} and {6, 9}, CS index 0 or 3 may be indicated using the 1-bit implicit indication.

Here, the PRB offset may be used to indicate the number of PRBs from the end/boundary of the band (e.g., the initial UL BWP) in which the UE is to transmit PUCCH to a PRB on which the PUCCH is transmitted. The (initial) UL BWP may refer to an (initial) UL band in which the UE transmits the PUCCH. As an example, when the number of PRBs in the initial UL BWP is $N_{BWP}$ and the PRBs are indexed from 0 to $N_{BWP}-1$, the index of the PUCCH PRB may be indicated by (i) a PRB offset or (ii) $N_{BWP}-1$-PRB offset. For simplicity, the PRB offset indicated by the DCI is referred to as a PRB offset (DCI). In an embodiment, the PRB offset (DCI) may be added to a cell-specific PRB offset (hereinafter, PRB offset (SI)) given by the RMSI. That is, the index of the PUCCH PRB may be given as (i) PRB offset (SI)+PRB offset (DCI) or (ii) $N_{BWP}-1$-PRB offset (SI)-PRB offset (DCI). The PRB offset (DCI) may be {0, 1}.

Here, the initial CS index may refer to a CS index resource used as a reference for UCI transmission on PUCCH F0 or a CS index resource used for UCI transmission on PUCCH F1.

Here, the FH directions may refer to (1) a case where the PUCCH is transmitted on a higher PRB in the UL band at the first frequency hop and is transmitted in a lower PRB in the UL band at the second frequency hop (↓), and (2) a case where the PUCCH is transmitted on a lower PRB in the UL band at the first frequency hop and is transmitted in a higher PRB in the UL band at the second frequency hop (↑).

Here, the 1-bit implicit indication may be obtained by mapping a CCE index to a 1-bit value based on an implicit rule. As an example, the implicit 1-bit may indicate 0 or 1, depending on which of the two CCE sets the starting CCE index of the PDCCH belongs to.

A specific example of the above-described scheme will be described.

Table 10 exemplarily shows PUCCH resource sets indicated by the system information. As an example, one of 16 PUCCH resource sets may be indicated by a 4-bit indicator in the RMSI. Symbol ↑ denotes frequency hopping from a low frequency to a high frequency, and symbol ↓ denotes frequency hopping from a high frequency to a low frequency. $N_{BWP}$ denotes the number of PRBs as a size of the (initial) UL BWP.

TABLE 10

| 4-bit RMSI | PUCCH duration | starting symbol | (cell specific) PRB offset |
|---|---|---|---|
| 0000 | 2 | 12 | 0 |
| 0001 | 2 | 12 | 2 |
| 0010 | 2 | 12 | 4 |
| 0011 | 2 | 12 | floor($N_{BWP}$/4) or 6 |
| 0100 | 4 | 10 | 0 |
| 0101 | 4 | 10 | 2 |
| 0110 | 4 | 10 | 4 |
| 0111 | 4 | 10 | floor($N_{BWP}$/4) or 6 |
| 1000 | 10 | 4 | 0 |
| 1001 | 10 | 4 | 2 |
| 1010 | 10 | 4 | 4 |
| 1011 | 10 | 4 | floor($N_{BWP}$/4) or 6 |
| 1100 | 14 | 0 | 0 |
| 1101 | 14 | 0 | 2 |
| 1110 | 14 | 0 | 4 |
| 1111 | 14 | 0 | floor($N_{BWP}$/4) or 6 |

Table 11 exemplarily shows information about the PRB offset, FH direction, starting symbol index, and (initial) CS index group indicated by the 3-bit ARI in the DCI for each of PUCCH F0 and PUCCH F1.

TABLE 11

| | PUCCH F0 | | | PUCCH F1 | | |
|---|---|---|---|---|---|---|
| 3-bit ARI | (UE-specific) PRB offset | FH direction | starting symbol index | (UE-specific) PRB offset | FH direction | CS index |
| 000 | 0 | ↑ | 10 | 0 | ↑ | {0, 3} |
| 001 | 0 | ↑ | 12 | 0 | ↑ | {6, 9} |
| 010 | 0 | ↓ | 10 | 0 | ↓ | {0, 3} |
| 011 | 0 | ↓ | 12 | 0 | ↓ | {6, 9} |
| 100 | 1 | ↑ | 10 | 1 | ↑ | {0, 3} |
| 101 | 1 | ↑ | 12 | 1 | ↑ | {6, 9} |
| 110 | 1 | ↓ | 10 | 1 | ↓ | {0, 3} |
| 111 | 1 | ↓ | 12 | 1 | ↓ | {6, 9} |

Table 12 shows an example of indicating a CS index through 1-bit implicit mapping. $CS_1$ and $CS_2$ denote the first CS index value and the second CS index value of the two CS index candidates for PUCCH F1, respectively.

TABLE 12

| 1-bit implicit. | PUCCH F0 CS index | PUCCH F1 CS index |
|---|---|---|
| 0 | 0 | $CS_1$ |
| 1 | 3 | $CS_2$ |

In this case, the OCC index value of PUCCH F1 may be determined by a specific function according to the CS index value. As an example, a value obtained by applying a modulo operation with OCC length L to the CS index may be used as an OCC index. Alternatively, the OCC index value of PUCCH F1 may be a predetermined value.

Table 13 shows an example of a combination of Tables 11 and 12. When a PUCCH resource set is configured by the 4-bit indicator of the RMSI, the PUCCH resources that are actually used for transmission of UCI (e.g., HARQ-ACK) may be defined to satisfy the relationship in the following table based on the 3-bit field in the DCI and the 1-bit information according to the CCE index-based implicit indication.

TABLE 13

| 3-bit ARI ($b_2b_1b_0$) | CCE-based implicit 1-bit ($c_0$) | (UE-specific) PRB offset ($b_2$) | FH direction ($b_1$) | (initial) CS index ($b_0$, $c_0$) |
|---|---|---|---|---|
| 000 | 0 | 0 | ↑ | 0 |
|  | 1 |  |  | 3 |
| 001 | 0 |  |  | 6 |
|  | 1 |  |  | 9 |
| 010 | 0 |  | ↓ | 0 |
|  | 1 |  |  | 3 |
| 011 | 0 |  |  | 6 |
|  | 1 |  |  | 9 |
| 100 | 0 | 1 | ↑ | 0 |
|  | 1 |  |  | 3 |
| 101 | 0 |  |  | 6 |
|  | 1 |  |  | 9 |
| 110 | 0 |  | ↓ | 0 |
|  | 1 |  |  | 3 |
| 111 | 0 |  |  | 6 |
|  | 1 |  |  | 9 |

Here, the relationship between $b_2b_1b_0$ and {PRB offset, FH direction, CS index} may be changed. For example, $b_2$ may be used to indicate the FH direction, and $b_1$ may be used to indicate the PRB offset.

Figure 10:
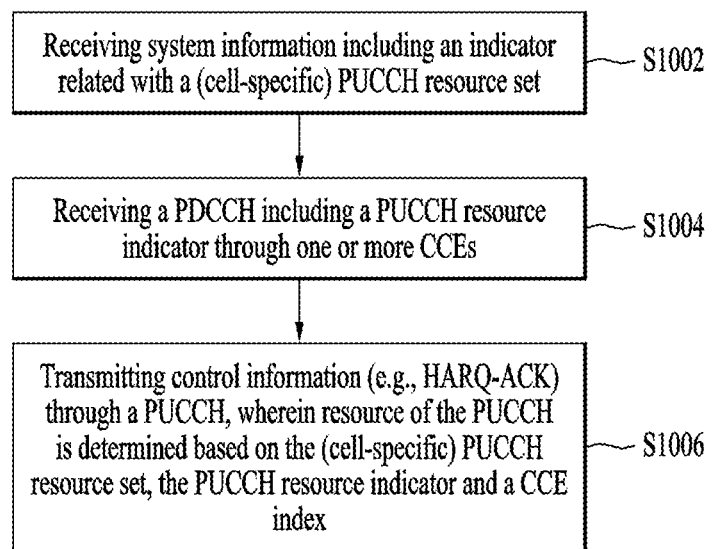
FIGS. 10 to 13 illustrate a PUCCH resource allocation procedure according to the present invention.

FIG. 10 illustrates a procedure of transmitting control information according to the present invention.

Referring to FIG. 10, a UE may receive indication information related to a (cell-specific) PUCCH resource set through system information (S1002). Here, the PUCCH resource set indicated by the system information may be related to a specific PUCCH format (e.g., PUCCH format 1). The system information includes RMSI. Then, the UE may receive a PDCCH including a resource indicator (RI) including a PUCCH RI through one or more CCEs (S1004). Here, the PDCCH may carry DCI for scheduling the PDSCH, and the RI may be included in the DCI. Then, the UE may transmit the control information over the PUCCH. In this case, the PUCCH resource may be determined based on the (cell-specific) PUCCH resource set, the RI, and the CCE index (S1006). Here, the control information may include HARQ-ACK for the PDSCH (i.e., downlink data) scheduled by the PDCCH.

Figure 11:
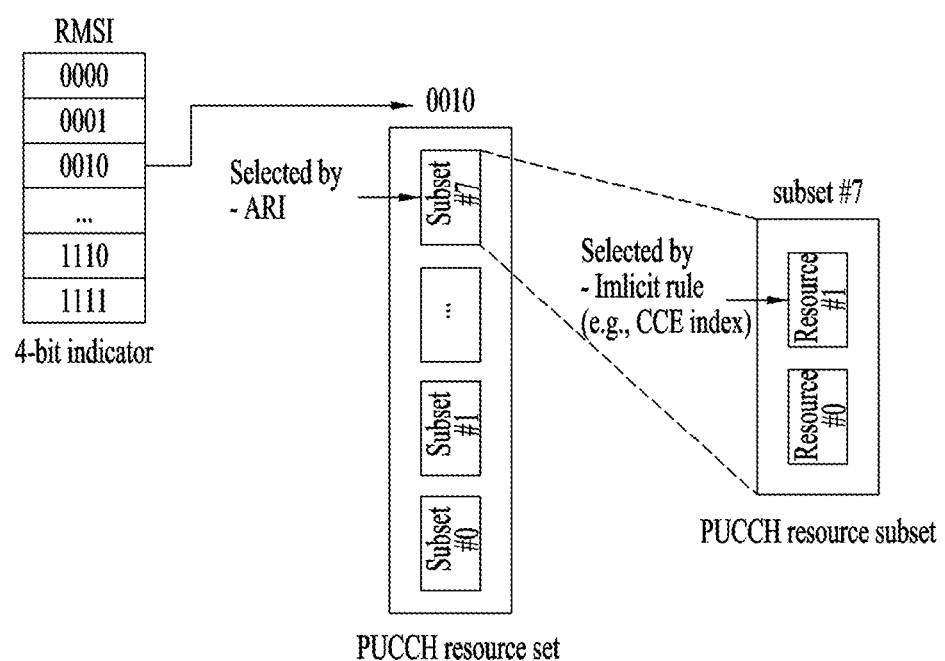

FIG. 11 illustrates a procedure of determining control information according to the present invention.

Referring to FIG. 11, a PUCCH resource may be determined through three steps. In a first step, one of the $2^X$ PUCCH resource sets may be configured for the UE through an X-bit indicator in the RMSI. In a second step, one subset in the PUCCH resource set (configured in the first step) may be indicated to the UE through 3-bit information (RI) in the DCI. In a third step, a PUCCH resource in the PUCCH resource subset (indicated in the second step) may be indicated to the UE using an implicit rule, for example, CCE-based implicit 1-bit information. Here, the first to third steps may be performed separately or in combination.

Here, the PUCCH resource may be determined using the scheme proposed above (e.g., see Opts. 1 and 2, and Tables 7 to 13). As an example, the PUCCH resource set may include a first RB offset, and the RB index of the PUCCH may be determined based on a first RB offset and a second RB offset related to a first bit value of the RI. Further, a CS index of the PUCCH may be determined in a CS index set based on a combination of [a second bit value of the RI, a 1-bit value based on a starting CCE index of the PDCCH (hereinafter, a CCE-based 1-bit value)]. Here, the second bit value of the RI may be used to indicate one of two CS index groups, and the CCE-based 1-bit value may be used to indicate one of two CS indexes in the indicated CS index group. In addition, the frequency hopping direction of the PUCCH may be determined as one of two directions based on a third bit value of the RI.

Here, the second RB offset, the CS index and the frequency hopping direction for the PUCCH may be determined to satisfy the relationship given in the following table:

TABLE 14

| RI ($b_2b_1b_0$) | CCE-based 1 bit ($c_0$) | Second RB offset ($b_2$) | FH direction ($b_1$) | CS index ($b_0, c_0$) |
|---|---|---|---|---|
| 000 | 0 | 0 | First direction | 0 |
|  | 1 |  |  | 3 |
| 001 | 0 |  |  | 6 |
|  | 1 |  |  | 9 |
| 010 | 0 |  | Second direction | 0 |
|  | 1 |  |  | 3 |
| 011 | 0 |  |  | 6 |
|  | 1 |  |  | 9 |
| 100 | 0 | 1 | First direction | 0 |
|  | 1 |  |  | 3 |
| 101 | 0 |  |  | 6 |
|  | 1 |  |  | 9 |
| 110 | 0 |  | Second direction | 0 |
|  | 1 |  |  | 3 |
| 111 | 0 |  |  | 6 |
|  | 1 |  |  | 9 |

Here, $b_2$ denotes the first bit value of the RI, $b_1$ denotes the third bit value of the RI, and $b_0$ denotes the second bit value of the RI, and a relationship between $b_2$ to $b_0$ and the first to third bit values of the RI is changeable.

Figure 12:
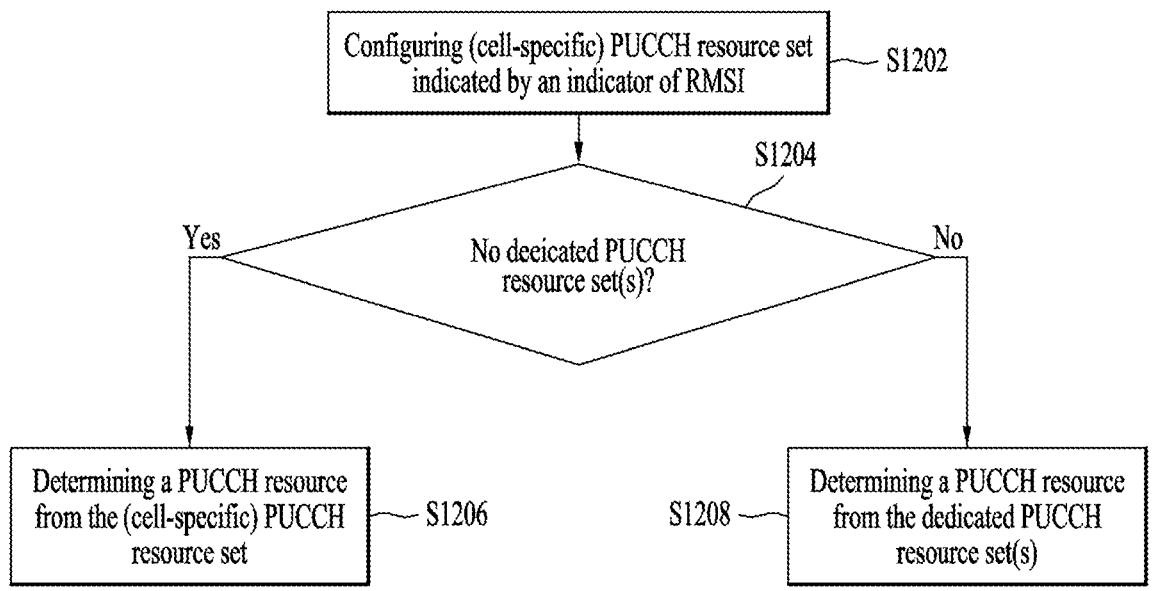

FIG. 12 illustrates a procedure of transmitting control information according to another example of the present invention.

Referring to FIG. 12, the UE may configure a (cell-specific) PUCCH resource set indicated by system information (e.g., RMSI) (S1202). Thereafter, in determining a PUCCH resource, the PUCCH resource determination procedure may be changed depending on whether the UE-specific PUCCH resource set(s) are configured (S1204). In determining a PUCCH resource, if there is no UE-dedicated (or UE-specific) PUCCH resource set(s) configured (S1204, Yes), the UE may determine a PUCCH resource from the (cell-specific) PUCCH resource set (S1206). For determining the PUCCH resource from the (cell-specific) PUCCH resource set, the description of the proposed scheme (e.g., FIGS. 10 and 11) may be referenced. On the other hand, if there is any UE-specific PUCCH resource set(s) configured (S1204, No), the UE may determine a PUCCH resource in the (UE-dedicated) PUCCH resource set (S1208). Since the (UE-dedicated) PUCCH resource set may be configured through the RRC connection setup procedure, the PUCCH resource determination in S1206 may be applied only to HARQ-ACK transmission for a PDSCH prior to the RRC connection setup. As an example, the PUCCH resource determination in S1206 may be used only in the HARQ-ACK transmission for the PDSCH (e.g., RACH Msg4) in the initial access procedure of the UE. On the other hand, the PUCCH resource determination in S1208 may be used in the HARQ-ACK transmission for PDSCH after the RRC connection setup, for example, the HARQ-ACK transmission for the PDSCH after the initial access procedure.

Figure 13:
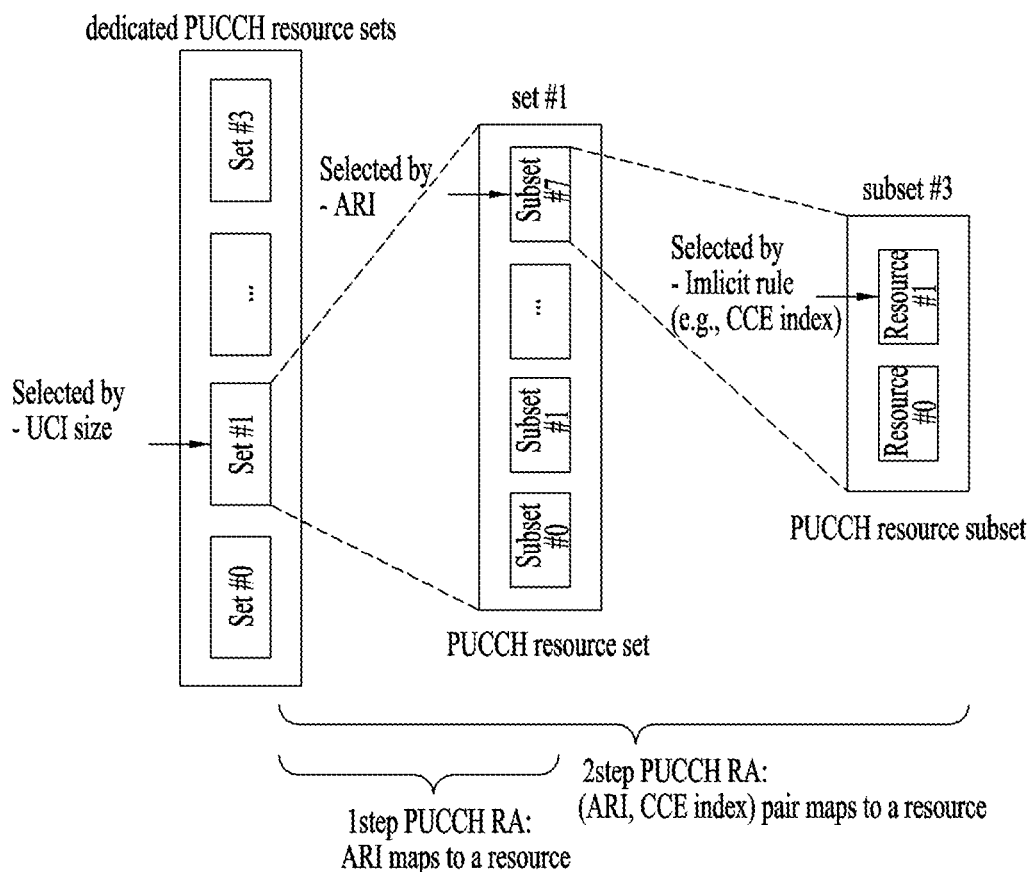

For determination of a PUCCH resource from the (UE-dedicated) PUCCH resource set, FIG. 13 may be referenced. Referring to FIG. 13, a base station may configure a plurality of (UE-dedicated) PUCCH resource sets for the UE, and the UE may select a specific PUCCH set corresponding to a specific range according to a range of UCI (payload) size (e.g., the number of UCI bits). Then, the base station may transmit DCI to the UE on the PDCCH, and indicate, through the ARI in the DCI, a PUCCH resource to be used for the UCI transmission in the specific PUCCH resource set (see the above-described one-step PUCCH RA scheme). In addition, when the PUCCH resource set consists of PUCCH resources more than the number of states representable by the ARI, the ARI may indicate a PUCCH resource subset in the PUCCH resource set, and a PUCCH resource to be used in the indicated PUCCH resource subset may be determined according to an implicit rule that is based on the CCE index or the like (see the above-described two-step PUCCH RA scheme).

[Proposed Scheme #4]

In a situation where a PUCCH resource set is configured for each UCI payload size range (e.g., UCI payload size A of 2 bits or less; UCI payload size B of more than 2 bits) for HARQ-ACK transmission, the number of HARQ-ACK bits for the UE to report may be 1 or 2.

In a case, the UE may be assigned a configuration of a dynamic HARQ-ACK codebook and receive only PDSCHs having a 1-transport block (TB) and a DAI value of 1. In this case, the UE may transmit a 1-bit HARQ-ACK payload using a specific PUCCH resource. However, in practice, the base station may schedule two 1-TB PDSCHs, and the UE may fail to detect the second PDSCH of the PDSCHs. In this case, the base station expects PUCCH transmission for a 2-bit HARQ-ACK payload, while the UE performs PUCCH transmission for the 1-bit HARQ-ACK payload. Thereby, inconsistency may occur between the base station and the UE.

In order to address the above-described issue, when the UE has a assigned configuration of a dynamic HARQ-ACK codebook, a 2-bit HARQ-ACK payload may always be configured even if the number of HARQ-ACK bits corresponding to the PDSCH received by the UE is 1. The proposed operation may be more effective when only PDSCHs having a 1-TB and a DAI value of 1 is received.

As an example, when only the PDSCH corresponding to 1-TB and DAI=1 is received, the UE may configure a 2-bit HARQ-ACK payload that indicates NACK for an imaginary PDSCH corresponding to a HARQ-ACK result (hereinafter, D) for the received PDSCH and DAI=2 (e.g., {D, NACK}). Specifically, suppose that the PUCCH format for transmitting the 2-bit HARQ-ACK is format 1, and four constellation points $-1-j$, $-1+j$, $1+j$ and $1-j$ correspond to {NACK, NACK} {NACK, ACK}, {ACK, ACK}, and {ACK, NACK}, respectively. Here, if D is ACK, the UE may transmit $1-j$ corresponding to {ACK, NACK}. Suppose that the PUCCH format for transmitting the 2-bit HARQ-ACK is format 0, and CS indexes 0, 3, 6, and 9 correspond to {NACK, NACK}, {NACK, ACK}, {ACK, ACK}, and {ACK, NACK}, respectively. Here, if D is ACK, the UE may transmit a sequence corresponding to CS index 9.

In the NR system, CS allocation (excluding the initial offset value) for PUCCH format 0 is configured according to the HARQ-ACK and the UCI state of the SR as shown below.

TABLE 15

| | 1-bit HARQ-ACK | | | | 2-bits HARQ-ACK | | | | | | | |
|---|---|---|---|---|---|---|---|---|---|---|---|---|
| | Negative SR | | Positive SR | | Negative SR | | | | Positive SR | | | |
| | N | A | N | A | N, N | N, A | A, A | A, N | N, N | N, A | A, A | A, N |
| CS | 0 | 6 | 3 | 9 | 0 | 3 | 6 | 9 | 1 | 4 | 7 | 10 |

Here, 'N' denotes NACK, and 'A' denotes ACK. 'N, N', 'N, A', 'A, A', and 'A, N' denote {NACK, NACK}, {NACK, ACK}, {ACK, ACK}, and {ACK, NACK}, respectively. As described above, in the case where the base station schedules two 1-TB PDSCHs for the UE and the UE fails to detect the second PDSCH of the PDSCHs, the base station expects PUCCH transmission for a 2-bit HARQ-ACK payload, while the UE performs PUCCH transmission for a 1-bit HARQ-ACK payload. Thereby, inconsistency may occur between the base station and the UE. In addition, in the above example, when the UE transmits 1-bit HARQ-ACK and a positive SR, the base station may misunderstand that the UE has transmitted 2-bit HARQ-ACK information.

In order to address the above-mentioned issue, it is proposed that the UE apply the following HARQ-ACK to CS mapping differently according to a specific condition. As an example, when the A/N payload size is 2 bits or less and PUCCH format 0 including SR information is transmitted, the UE may apply HARQ-ACK to CS mapping differently according to specific conditions as follows.

(1) If the A/N payload size is 2 bits and the DAI indicates that two PDSCHs (or TBs) have been accumulated (e.g., the UE recognizes that two 1-TB PDSCHs have been scheduled therefor), [HARQ-ACK to CS mapping #1] in Table 16 may be applied.

(2) Otherwise (e.g., if one 2-TB PDSCH is scheduled), [HARQ-ACK to CS mapping #2] in Table 17 may be applied.

TABLE 16

| | 1-bit HARQ-ACK | | | | 2-bit HARQ-ACK | | | | | | | |
|---|---|---|---|---|---|---|---|---|---|---|---|---|
| | Negative SR | | Positive SR | | Negative SR | | | | Positive SR | | | |
| | N | A | N | A | N, N | N, A | A, A | A, N | N, N | N, A | A, A | A, N |
| CS | 0 | 6 | 1 | 7 | 0 | 3 | 9 | 6 | 1 | 4 | 10 | 7 |

TABLE 17

| | 1-bit HARQ-ACK | | | | 2-bit HARQ-ACK | | | | | | | |
|---|---|---|---|---|---|---|---|---|---|---|---|---|
| | Negative SR | | Positive SR | | Negative SR | | | | Positive SR | | | |
| | N | A | N | A | N, N | N, A | A, A | A, N | N, N | N, A | A, A | A, N |
| CS | 0 | 6 | 1 | 7 | 0 | 3 | 6 | 9 | 1 | 4 | 7 | 10 |

Here, the method of obtaining a CS resource for transmission of the 1-bit HARQ-ACK and the positive SR is the same as the method of obtaining a CS resource for transmission of the 2-bit HARQ-ACK and the positive SR. That is, a CS resource for transmission of HARQ-ACK and the positive SR may be obtained by applying a CS offset to the CS resource for transmission of HARQ-ACK and the negative SR (for each HARQ-ACK state).

In [HARQ-ACK to CS Mapping #1], the CS resource used for ACK is the same as that for {ACK, NACK}, and the CS resource used for NACK is the same as that for {NACK, NACK}. Accordingly, when the base station transmits HARQ-ACK for two 1-TB PDSCHs, the HARQ-ACK response to reception of the second PDSCH is naturally processed as NACK even if the UE fails to receive the second PDSCH. However, [HARQ-ACK to CS mapping #1] fails to satisfy a gray encoding relationship for the 2-bit HARQ-ACK, and thus has degraded Bit Error Rate (BER) performance. On the other hand, [HARQ-ACK to CS Mapping #2] satisfies the gray encoding relationship for the 2-bit HARQ-ACK, and thus exhibits excellent BER performance, whereas the CS resources used for ACK and {ACK, NACK} are different from each other. Accordingly, when the base station transmits HARQ-ACKs for two 1-TB PDSCHs, inconsistency may occur between the UE and the base station regarding HARQ-ACK information if the UE fails to receive the second PDSCH. Therefore, [HARQ-ACK to CS mapping #1] may be applied if the UE performs HARQ-ACK multiplexing (for example, a dynamic HARQ-ACK codebook is configured). Otherwise, [HARQ-ACK to CS mapping #2] may be applied.

Figure 14:
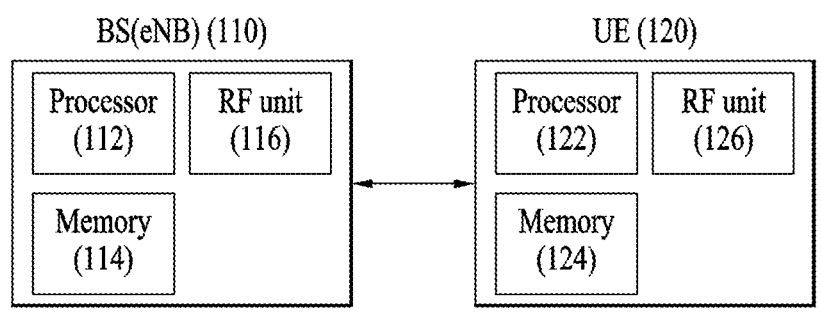
FIG. 14 illustrates a base station and a user equipment applicable to an embodiment of the present invention.

FIG. 14 illustrates a BS and a UE of a wireless communication system, which are applicable to embodiments of the present invention.

Referring to FIG. 14, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to UEs, eNBs or other apparatuses of a wireless mobile communication system.

The invention claimed is:

1. A method performed by a device in a wireless communication system, the method comprising:
   receiving system information including information for indicating one of common physical uplink control channel (PUCCH) resource sets, wherein the indicated common PUCCH resource set is associated with a resource block (RB) offset;
   receiving downlink control information (DCI) comprising scheduling information and a resource indicator (RI);
   receiving a downlink data based on the scheduling information; and
   based on no dedicated PUCCH resource being configured, transmitting acknowledgement/negative acknowledgement (ACK/NACK) information for the downlink data using a PUCCH resource determined from the indicated common PUCCH resource set,
   wherein an RB index of the PUCCH resource is determined based on the RB offset and a value related to the RI, and
   wherein a cyclic shift (CS) index applied to a sequence for the PUCCH resource is determined based on the RI and a control channel element (CCE) index related to the DCI.

2. The method of claim 1, wherein the RI is used to indicate one of two CS index groups, and the CCE index is used to indicate one of two CS indexes in the indicated CS index group.

3. The method of claim 1, wherein a frequency hopping (FH) direction of the PUCCH resource is determined as one of two directions based on the RI.

4. The method of claim 3, wherein the value, the CS index and the frequency hopping direction for the PUCCH resource are determined to satisfy the following table:

| RI ($b_2 b_1 b_0$) | Bit information related to the CCE index ($c_0$) | The value ($b_2$) | The FH direction ($b_1$) | CS index ($b_0, c_0$) |
|---|---|---|---|---|
| 000 | 0 | 0 | First direction | 0 |
|  | 1 |  |  | 3 |
| 001 | 0 |  |  | 6 |
|  | 1 |  |  | 9 |
| 010 | 0 |  | Second direction | 0 |
|  | 1 |  |  | 3 |
| 011 | 0 |  |  | 6 |
|  | 1 |  |  | 9 |
| 100 | 0 | 1 | First direction | 0 |
|  | 1 |  |  | 3 |
| 101 | 0 |  |  | 6 |
|  | 1 |  |  | 9 |
| 110 | 0 |  | Second direction | 0 |
|  | 1 |  |  | 3 |
| 111 | 0 |  |  | 6 |
|  | 1 |  |  | 9, | wherein $b_2$ denotes a first bit value of the RI, $b_1$ denotes a second bit value of the RI, and $b_0$ denotes a third bit value of the RI, and a relationship between $b_2$ to $b_0$ and the first to third bit values of the RI is changeable.

5. A device configured to operate in a wireless communication system, the device comprising:
a memory; and
a processor,
wherein the processor is configured to:
receive system information including information for indicating one of common physical uplink control channel (PUCCH) resource sets, wherein the indicated common PUCCH resource set is associated with a resource block (RB) offset,
receive downlink control information (DCI) comprising scheduling information and a resource indicator (RI),
receive a downlink data based on the scheduling information, and
based on no dedicated PUCCH resource being configured, transmit acknowledgement/negative acknowledgement (ACK/NACK) information for the downlink data using a PUCCH resource determined from the indicated common PUCCH resource set,
wherein an RB index of the PUCCH resource is determined based on the RB offset and a value related to the RI, and
wherein a cyclic shift (CS) index applied to a sequence for the PUCCH resource is determined based on the RI and a control channel element (CCE) index related to the DCI.

6. The device of claim 5, wherein the RI is used to indicate one of two CS index groups, and the CCE index is used to indicate one of two CS indexes in the indicated CS index group.

7. The device of claim 5, wherein a frequency hopping (FH) direction of the PUCCH resource is determined as one of two directions based on the RI.

8. The device of claim 7, wherein the value, the CS index and the frequency hopping direction for the PUCCH resource are determined to satisfy the following table:

| RI ($b_2 b_1 b_0$) | Bit information related to the CCE index ($c_0$) | The value ($b_2$) | The FH direction ($b_1$) | CS index ($b_0, c_0$) |
| --- | --- | --- | --- | --- |
| 000 | 0 | 0 | First direction | 0 |
|  | 1 |  |  | 3 |
| 001 | 0 |  |  | 6 |
|  | 1 |  |  | 9 |
| 010 | 0 |  | Second direction | 0 |
|  | 1 |  |  | 3 |
| 011 | 0 |  |  | 6 |
|  | 1 |  |  | 9 |
| 100 | 0 | 1 | First direction | 0 |
|  | 1 |  |  | 3 |
| 101 | 0 |  |  | 6 |
|  | 1 |  |  | 9 |
| 110 | 0 |  | Second direction | 0 |
|  | 1 |  |  | 3 |
| 111 | 0 |  |  | 6 |
|  | 1 |  |  | 9, | wherein $b_2$ denotes a first bit value of the RI, $b_1$ denotes a second bit value of the RI, and $b_0$ denotes a third bit value of the RI, and a relationship between $b_2$ to $b_0$ and the first to third bit values of the RI is changeable.

9. A method performed by a device in a wireless communication system, the method comprising:
transmitting system information including information for indicating one of common physical uplink control channel (PUCCH) resource sets, wherein the indicated common PUCCH resource set is associated with a resource block (RB) offset;
transmitting downlink control information (DCI) comprising scheduling information and a resource indicator (RI);
transmitting a downlink data based on the scheduling information; and
based on no dedicated PUCCH resource being configured, receiving acknowledgement/negative acknowledgement (ACK/NACK) information for the downlink data using a PUCCH resource determined from the indicated common PUCCH resource set,
wherein an RB index of the PUCCH resource is determined based on the RB offset and a value related to the RI, and
wherein a cyclic shift (CS) index applied to a sequence for the PUCCH resource is determined based on the RI and a control channel element (CCE) index related to the DCI.

10. The method of claim 9, wherein the RI is used to indicate one of two CS index groups, and the CCE index is used to indicate one of two CS indexes in the indicated CS index group.

11. The method of claim 9, wherein a frequency hopping (FH) direction of the PUCCH resource is determined as one of two directions based on the RI.

12. The method of claim 11, wherein the value, the CS index and the frequency hopping direction for the PUCCH resource are determined to satisfy the following table:

| RI ($b_2 b_1 b_0$) | Bit information related to the CCE index ($c_0$) | The value ($b_2$) | The FH direction ($b_1$) | CS index ($b_0, c_0$) |
| --- | --- | --- | --- | --- |
| 000 | 0 | 0 | First direction | 0 |
|  | 1 |  |  | 3 |
| 001 | 0 |  |  | 6 |
|  | 1 |  |  | 9 |
| 010 | 0 |  | Second direction | 0 |
|  | 1 |  |  | 3 |
| 011 | 0 |  |  | 6 |
|  | 1 |  |  | 9 |
| 100 | 0 | 1 | First direction | 0 |
|  | 1 |  |  | 3 |
| 101 | 0 |  |  | 6 |
|  | 1 |  |  | 9 |
| 110 | 0 |  | Second direction | 0 |
|  | 1 |  |  | 3 |
| 111 | 0 |  |  | 6 |
|  | 1 |  |  | 9, | wherein $b_2$ denotes a first bit value of the RI, $b_1$ denotes a second bit value of the RI, and $b_0$ denotes a third bit value of the RI, and a relationship between $b_2$ to $b_0$ and the first to third bit values of the RI is changeable.

13. A device configured to operate in a wireless communication system, the device comprising:
a memory; and
a processor,
wherein the processor is configured to:
transmit system information including information for indicating one of common physical uplink control channel (PUCCH) resource sets, wherein the indicated common PUCCH resource set is associated with a resource block (RB) offset;
transmit downlink control information (DCI) comprising scheduling information and a resource indicator (RI), transmit a downlink data based on the scheduling information, and based on no dedicated PUCCH resource being configured, receive acknowledgement/negative acknowledgement (ACK/NACK) information for the downlink data using a PUCCH resource determined from the indicated common PUCCH resource set, wherein an RB index of the PUCCH resource is determined based on the RB offset and a value related to a value of the RI, and wherein a cyclic shift (CS) index applied to a sequence for the PUCCH resource is determined based on the RI and a control channel element (CCE) index related to the DCI.

14. The device of claim 13, wherein the RI is used to indicate one of two CS index groups, and the CCE index is used to indicate one of two CS indexes in the indicated CS index group.

15. The device of claim 13, wherein a frequency hopping (FH) direction of the PUCCH resource is determined as one of two directions based on the RI.

16. The device of claim 15, wherein the value, the CS index and the frequency hopping direction for the PUCCH resource are determined to satisfy the following table:

| RI ($b_2 b_1 b_0$) | Bit information related to the CCE index ($c_0$) | The value ($b_2$) | The FH direction ($b_1$) | CS index ($b_0, c_0$) |
|---|---|---|---|---|
| 000 | 0 | 0 | First direction | 0 |
|     | 1 |   |                 | 3 |
| 001 | 0 |   |                 | 6 |
|     | 1 |   |                 | 9 |
| 010 | 0 |   | Second direction | 0 |
|     | 1 |   |                  | 3 |
| 011 | 0 |   |                  | 6 |
|     | 1 |   |                  | 9 |
| 100 | 0 | 1 | First direction  | 0 |
|     | 1 |   |                  | 3 |
| 101 | 0 |   |                  | 6 |
|     | 1 |   |                  | 9 |
| 110 | 0 |   | Second direction | 0 |
|     | 1 |   |                  | 3 |
| 111 | 0 |   |                  | 6 |
|     | 1 |   |                  | 9, | wherein $b_2$ denotes a first bit value of the RI, $b_1$ denotes a second bit value of the RI, and $b_0$ denotes a third bit value of the RI, and a relationship between $b_2$ to $b_0$ and the first to third bit values of the RI is changeable.

* * * * *